United States Patent

Kaneyama

[11] Patent Number: 5,937,246
[45] Date of Patent: Aug. 10, 1999

[54] COLOR PRINTER HAVING UNIT CONTROLLING EVACUATION AND RETURN OF PRINTING UNITS

[75] Inventor: Hiroshi Kaneyama, Yokohama, Japan

[73] Assignee: Fujitsu Limited, Kanagawa, Japan

[21] Appl. No.: 08/663,775

[22] Filed: Jun. 14, 1996

[30] Foreign Application Priority Data

Dec. 22, 1995 [JP] Japan ................................. 7-335530

[51] Int. Cl.⁶ .................................................. G03G 15/01
[52] U.S. Cl. .......................... 399/228; 358/515; 399/54; 399/299
[58] Field of Search ............................ 355/327, 326 R; 399/299, 54, 85, 184, 228; 358/501, 515; 382/162; 395/115, 116, 110

[56] References Cited

U.S. PATENT DOCUMENTS

| | | | |
|---|---|---|---|
| 3,947,114 | 3/1976 | Washio et al. | 399/184 |
| 5,070,374 | 12/1991 | Murahashi et al. | 399/54 |
| 5,144,387 | 9/1992 | Tanaka et al. | 399/54 |
| 5,282,012 | 1/1994 | Terada et al. | 355/327 |
| 5,361,329 | 11/1994 | Morita et al. | 395/102 |
| 5,541,634 | 7/1996 | Otsuka et al. | 355/327 X |
| 5,568,285 | 10/1996 | Ikeda | 358/518 |

FOREIGN PATENT DOCUMENTS 63-8659  1/1996  Japan .

*Primary Examiner*—Arthur T. Grimley
*Assistant Examiner*—Quana Grainger
*Attorney, Agent, or Firm*—Armstrong, Westerman, Hattori, McLeland & Naughton

[57] ABSTRACT

A color printer which performs a printing operation according to data from an upper unit such as a host computer. Switching mechanisms each which switches the state of each color printing unit to either a return state or an evacuation state are respectively arranged to the color printing units. A control unit judges as an unused color a color satisfying a predetermined unused condition among the plural colors and controls the corresponding at least one of switching mechanisms to switch the state of the color printing units corresponding to the unused color to the evacuation state. Since the evacuation operation of the color printing unit is performed without deteriorating the printing performance, the reduced power consumption, prolonged serviceable life of a color printing unit with a low use frequency, and improved print quality can be realized.

11 Claims, 23 Drawing Sheets

EVACUATION / RETURN OPERATION
MODE INFORMATION

- "00" : NO EVACUATION / RETURN OPERATION
- "01" : PAGE UNIT TIMING
- "02" : JOB / FILE TIMING
- "03" : OPERATOR SETTING TIMING
- "04" : OVERLAY PRINT TIMING

EVACUATING TIMING PAGE NUMBER INFORMATION

| FLAG | YELLOW (Y) EVACUATING TIMING PAGE NUMBER |
|------|-------------------------------------------|
| FLAG | MAGENTA (M) EVACUATING TIMING PAGE NUMBER |
| FLAG | CYAN (C) EVACUATING TIMING PAGE NUMBER |
| FLAG | BLACK (K) EVACUATING TIMING PAGE NUMBER |

→ EVACUATING CONTROL (0: NOT NEEDED, 1: NEEDED)

COLOR PRINTER HAVING UNIT CONTROLLING EVACUATION AND RETURN OF PRINTING UNITS

BACKGROUND OF THE INVENTION

1) Field of the Invention

The present invention relates to a color printer which is connected to an upper unit such as a host computer to perform a printing operation according to data from the upper unit.

2) Description of the Related Art

Generally, as shown in FIG. 22, a color printer 100 is connected to a host computer 110 acting as an upper unit. The color printer 100 receives data from the host computer 110 and then performs a color printing on a predetermined sheet.

The printer 100 generally consists of a color-print mechanical engine 101, a double-sided surface mechanism unit 102, hoppers 103 and 104, a cassette 105, a tray 106, a stacker 107, and an operator panel 108.

The color-print mechanical engine 101 is a mechanism which performs a color printing operation on a predetermined sheet. The double-sided surface mechanism unit 102 is a mechanism which reverses a predetermined sheet to perform a double-sided printing on it.

The hoppers 103 and 104 each store ordinary paper of a predetermined size as print sheets. The cassette 105 stores color sheets each which is fed, prior to shifting to the next job print and after a completion of a job print, to divide the job printing operation. The tray 106 and the stacker 107 each serves as a printed sheet ejecting device.

Moreover, the operator panel 108 includes a control key, switches, and others used for inputting various instructions to the printer 100 as well as a display unit which displays the operation state of the printer 100. Referring to FIG. 22, numeral 111 represents a main console arranged to the host computer 110. The main console 111 includes a control key, switches, a display unit, and others to intervene or monitor the operation of the host computer 110 according to operator's requests.

As shown in FIG. 23, the color-print mechanical engine 101 includes four color printing units 111Y, 111M, 111C and 111K. The color printing unit 111Y prints in yellow (Y) color. The color printing unit 111M prints in magenta (M) color. The color printing unit 111C prints in cyan (C) color. The color printing unit 111K prints in black (K) color. Each color printing unit includes a developing unit 112, a photosensitive body (transfer drum) 113, an optical unit 114, and a transfer roller 115.

The elements 112 to 115 constituting each of the color printing units 111Y, 111M, 111C and 111K are very general. Hence, the detail explanation will be omitted here.

Numeral 116 represents a fixing unit and 117 represents a sheet conveying path.

In the color-print mechanical engine 101 with the configuration shown in FIG. 23, when a sheet fed out of the hopper 103 or 104 is fed from the color printing unit 111Y to the color printing unit 111K along the sheet conveying path 117, color printing units 111Y, 111M, 111C and 111K transfer respectively a color toner onto the sheet. Then a color printing is made by fixing the transferred toner on the sheet by means of the fixing unit 116.

In such a case, when the color printer 100 including the color printing units 111Y, 111M, 111C and 111K performs a monochrome printing, all the color printing units 111Y, 111M, 111C and 111K are always operating. Hence the photosensitive body (transfer drum) 113 of the color printing unit with less use frequency is wasted and the developing solution used in the color printing unit is deteriorated. Moreover, the color printer has a disadvantage of reducing the serviceable life of the color printing unit with a low use frequency.

Moreover, there is a disadvantage in that operating simultaneously the unused color printing unit wastes power consumption and results in a deteriorated print quality because the toner left on the photosensitive body (transfer drum) 113 of unused color printing unit adheres on the sheet and becomes a stain.

For that reason, in order to prolong the serviceable life of a color printing unit with a low use frequency, it may be considered that the power consumption is decreased by performing the evacuation/return operation of each color printing unit, in which a color printing unit not used is put into an evacuation state in advance, not directly in contact with a print sheet, (referred to as an evacuation operation) and then the color printing unit in the evacuation state is set in a return state (referred to as a return operation) in which printing is performed on a print sheet when printing is performed with the color printing unit, for each print page by using color information of print data.

The evacuation/return operation of each color printing unit is mechanically motorized with the printing operation ceased. Hence there is a disadvantage in that the evacuation/return operation of each color printing unit for each print page takes much time, thus degrading the printing performance.

SUMMARY OF THE INVENTION

The present invention is made to overcome the above mentioned problems. An object of the present invention is to provide a color printer which can reduce power consumption and prolong the serviceable life of a color printing unit (photosensitive body or developer) with a low use frequency, by performing the evacuation/return operation of the color printing unit without deteriorating the printing performance, and can improve the print quality by surely preventing toner of unused color from adhering as a stain with a sheet.

In order to achieve the above objects, according to the present invention, the color printer is characterized by plural color printing units each for printing a print image in a color on a print sheet to perform a color printing by overlaying plural colors; switching mechanisms each for switching the state of each of the color printing units to either a return state in which each of the color printing units performs a printing operation on the print sheet or an evacuation state in which each of the color printing units is not directly in contact with the printing sheet; and a control unit for controlling the switching operation of each of the switching mechanisms; the control unit judging as an unused color a color satisfying a predetermined unused condition among the plural colors and controlling the switching operation of the corresponding at least one of switching mechanisms arranged to the color printing units to switch the state of the color printing units corresponding to the unused color to the evacuation state.

Therefore the color printer according to the present invention can significantly reduce the power consumption while maintaining the print performance and prolong the serviceable life of a color printing unit with a low use frequency, thus improving the print quality.

DESCRIPTION OF THE PREFERRED EMBODIMENTS (a) Aspect of Invention:

First, an aspect of the present invention will be explained by referring to the attached drawings.

Figure 1:
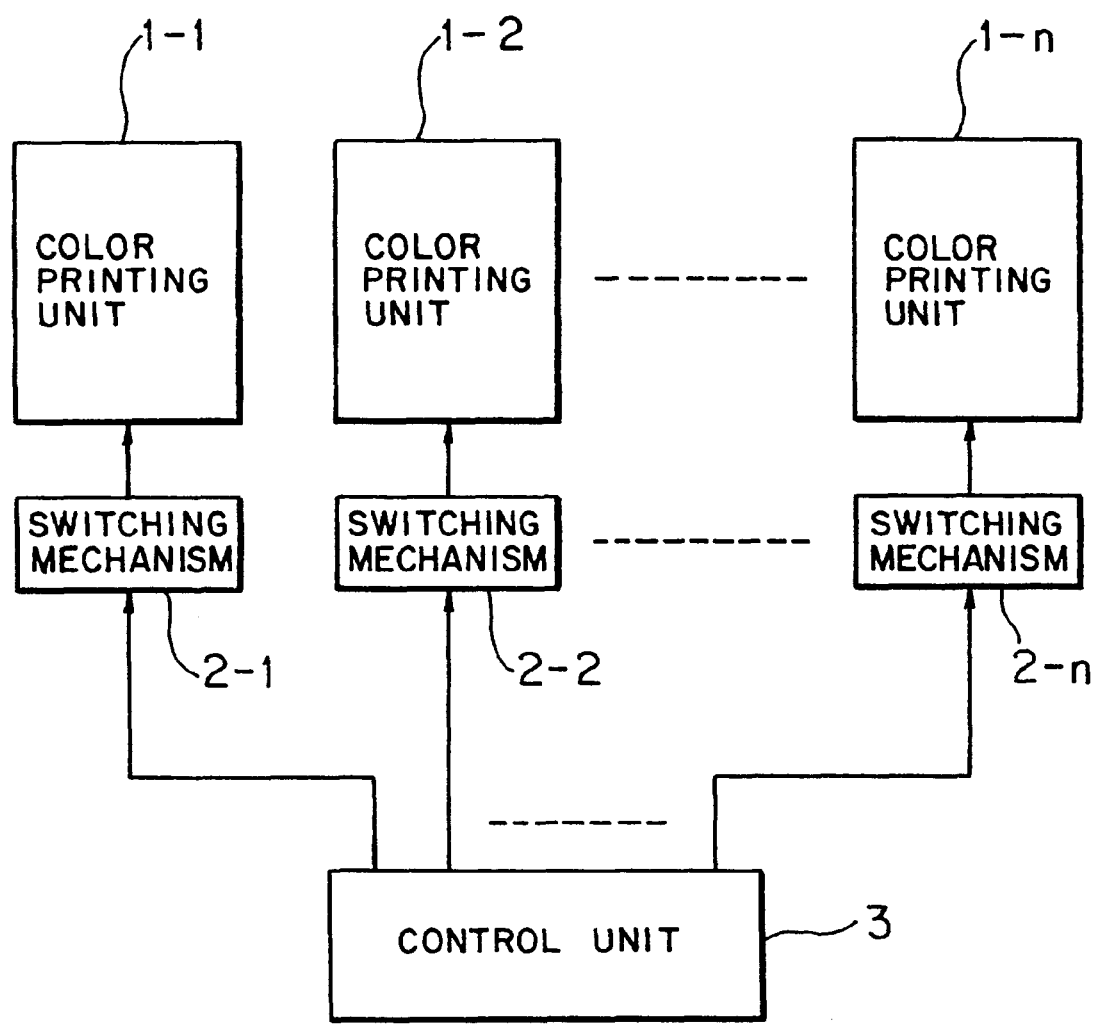
FIG. 1 is a block diagram showing an aspect of the present invention.

FIG. 1 is a block diagram showing an aspect of the present invention. Referring to FIG. 1, a color printer consists of plural color printing units 1-1 to 1-n each for printing a print image in each color on a print sheet to perform a color printing by overlaying plural colors; switching mechanisms 2-1 to 2-n connected respectively to color printing units 1-1 to 1-n; and a control unit 3 for controlling the switching operation of each of the switching mechanisms 2-1 to 2-n.

Each of the switching mechanisms 2-1 to 2-n switches the state of each color printing unit 1-1 to 1-n to either a return state in which each of the color printing units 1-1 to 1-n performs a printing operation on a print sheet or an evacuation state in which each of the color printing units 1-1 to 1-n is not directly in contact with a print sheet.

The control unit 3 judges as an unused color a color satisfying a predetermined unused condition among the plural colors and controls the switching operation of the corresponding at least one of switching mechanisms 2-1 to 2-n respectively arranged to color printing units 1-1 to 1-n to switch the state of the color printing units 1-1 to 1-n corresponding to the unused color to the evacuation state.

The predetermined unused condition corresponds to a color which is never used while a color printing is being made continuously on a print sheet of a specified page number (referred to as a first mode).

In this case, the control unit 3 controls the switching operation of the corresponding at least one of switching mechanisms 2-1 to 2-n arranged to color printing units 1-1 to 1-n when a page to be color-printed by using the color printing units 1-1 to 1-n which have been switched in the evacuation state by means of the switching mechanisms 2-1 to 2-n appears, to switch the state of the color printing units 1-1 to 1-n from the evacuation state to the return state.

The color printer, shown in FIG. 1, may include a page number setting unit which externally sets the specified page number. The page number setting unit may set the specified page number in every color printing unit.

The predetermined unused condition may correspond to a color which is judged as one which is never used during printing the data according to color information received prior to a print job data or print file data from the upper unit (referred to as a second mode).

The predetermined unused condition may correspond to a color designated by the unused color designating unit arranged to designate externally an unused color (referred to as a third mode).

Moreover, the predetermined unused condition may correspond to a color which is judged as one which is never used during an overlay printing operation according to overlay color information received prior to an overlay print request from the upper unit (referred to as a fourth mode).

The control unit 3 may execute at least two modes among four modes, the four modes including a first mode in which the predetermined unused condition corresponds to a color which is never used while a color printing is continuously made on a print sheet of a specified page number, a second mode in which the predetermined unused condition corresponds to a color which is never used during printing the data according to color information received prior to a print job data or print file data from the upper unit, a third mode in which the predetermined unused condition corresponds to a color which is designated by means of an unused color designating unit which externally designates an unused color, and a fourth mode in which the predetermined unused condition corresponds to a color which is never used during an overlay printing operation according to overlay color information received prior to an overlay print request from the upper unit; and may further include a mode designating unit which externally designates one mode among at least the two modes.

In the color printer according to the present invention, when a color printing in which plural colors are overlaid is performed by using color printing units 1-1 to 1-n each which prints in each color on a print sheet, the control unit 3 judges as an unused color a color satisfying a predetermined unused condition (a color which is never used while a color printing is being continuously performed to print a sheet of a specified page number) among plural colors and then controls the switching operation of the switching mechanisms 2-1 to 2-n to switch the condition of one of the color printing units 1-1 to 1-n corresponding to the unused color to an evacuation state in which the color printing units 1-1 to 1-n do not touch directly with the print sheet.

The control unit 3 controls the switching operation of the switching mechanisms 2-1 to 2-n when a page to be color-printed by using the color printing units 1-1 to 1-n switched in the evacuation state by means of the switching mechanisms 2-1 to 2-n appears, to switch the state of the color printing units 1-1 to 1-n from the evacuation state in which the color printing units 1-1 to 1-n do not touch directly with the print sheet to the return state in which the color printing units 1-1 to 1-n print on the print sheet.

Hence, the color printer according to the present invention includes the switching mechanisms 2-1 to 2-n respectively arranged to the color printing units 1-1 to 1-n as well as the control unit 3 which controls the switching operation of each of the switching mechanisms 2-1 to 2-n. The control unit 3 controls the switching operation of each of the switching mechanisms 2-1 to 2-n to switch the condition of the color printing units 1-1 to 1-n either to the return state or evacuation state. Hence the color printer has an advantage of realizing the significantly-reduced power consumption and the prolonged serviceable life of any one of the color printing units 1-1 to 1-n with a low use frequency while the printing performance can be maintained. Moreover the print quality can be improved.

The color printer according to the present invention includes a page number setting unit which sets externally the specified page number. Since the page number setting unit sets the specified page number in every color printing units 1-1 to 1-n, there is an advantage in that the evacuation/return operation of the color printing units 1-1 to 1-n can be realized according to the printing work, the printing operation or the use frequency of a print color.

Furthermore, according to the color printer of the present invention, the predetermined unused condition is defined as a color which is never used during printing data according to the color information received prior to data of a print job or print file from the upper unit. Therefore the color printer has an advantage of significantly reducing the power consumption while the printing performance is maintained. Moreover, the serviceable life of the color printing units 1-1 to 1-n with a low use frequency can be prolonged and the print quality can be improved.

The color printer of the present invention includes an unused color designating unit which designates externally an unused color. The predetermined unused condition is a color designated by means of the unused color designating unit. Hence the color printer has an advantage of significantly reducing the power consumption while the printing performance is maintained. Moreover, the serviceable life of the color printing units 1-1 to 1-n with a low use frequency can be prolonged while the print quality can be improved.

Moreover, according to the color printer of the present invention, the predetermined unused condition corresponds to a color which is judged as one which is never used during an overlay printing operation according to overlay color information received prior to an overlay print request from the upper unit. Therefore, the color printer has an advantage of reducing significantly the power consumption while the printing performance is maintained. In addition, the serviceable life of the color printing units 1-1 to 1-n of a low use frequency can be prolonged while the print quality can be improved.

According to the color printer of the present invention, the control unit 3 includes a mode designating unit which designates externally one mode among at least the two modes to execute at least two modes among four modes including the first to fourth modes. Therefore the evacuation/return operation of the color printing units 1-1 to 1-n suitable for various print job modes can be realized advantageously according to the print jobs, the print operation and the use frequency of a print color.

(b) Embodiment of Invention:

Next, an embodiment according to the present invention will be described below with reference to the attached drawings.

Figure 2:
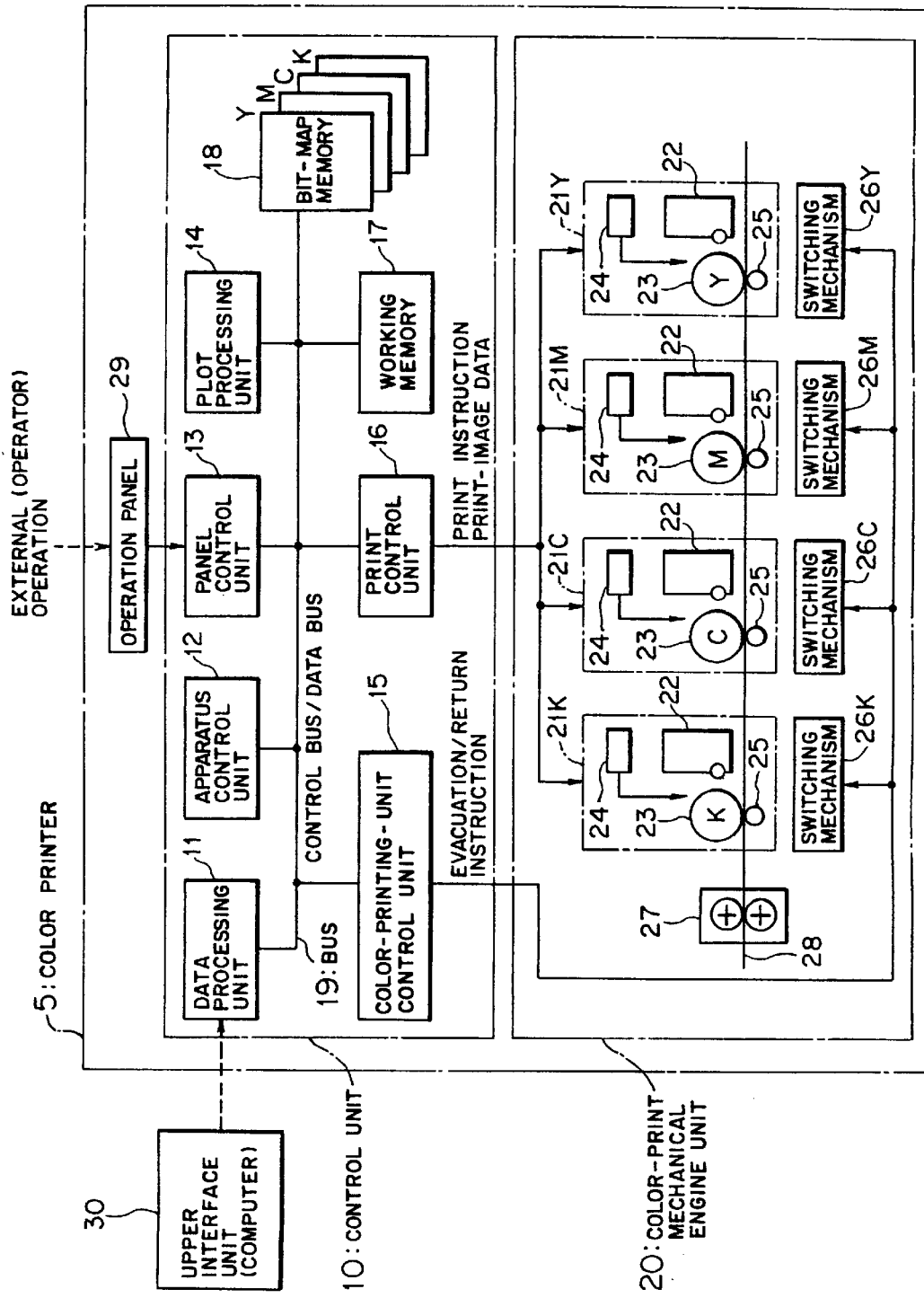
FIG. 2 is a block diagram showing a color printer according to an embodiment of the present invention.
Figure 22:
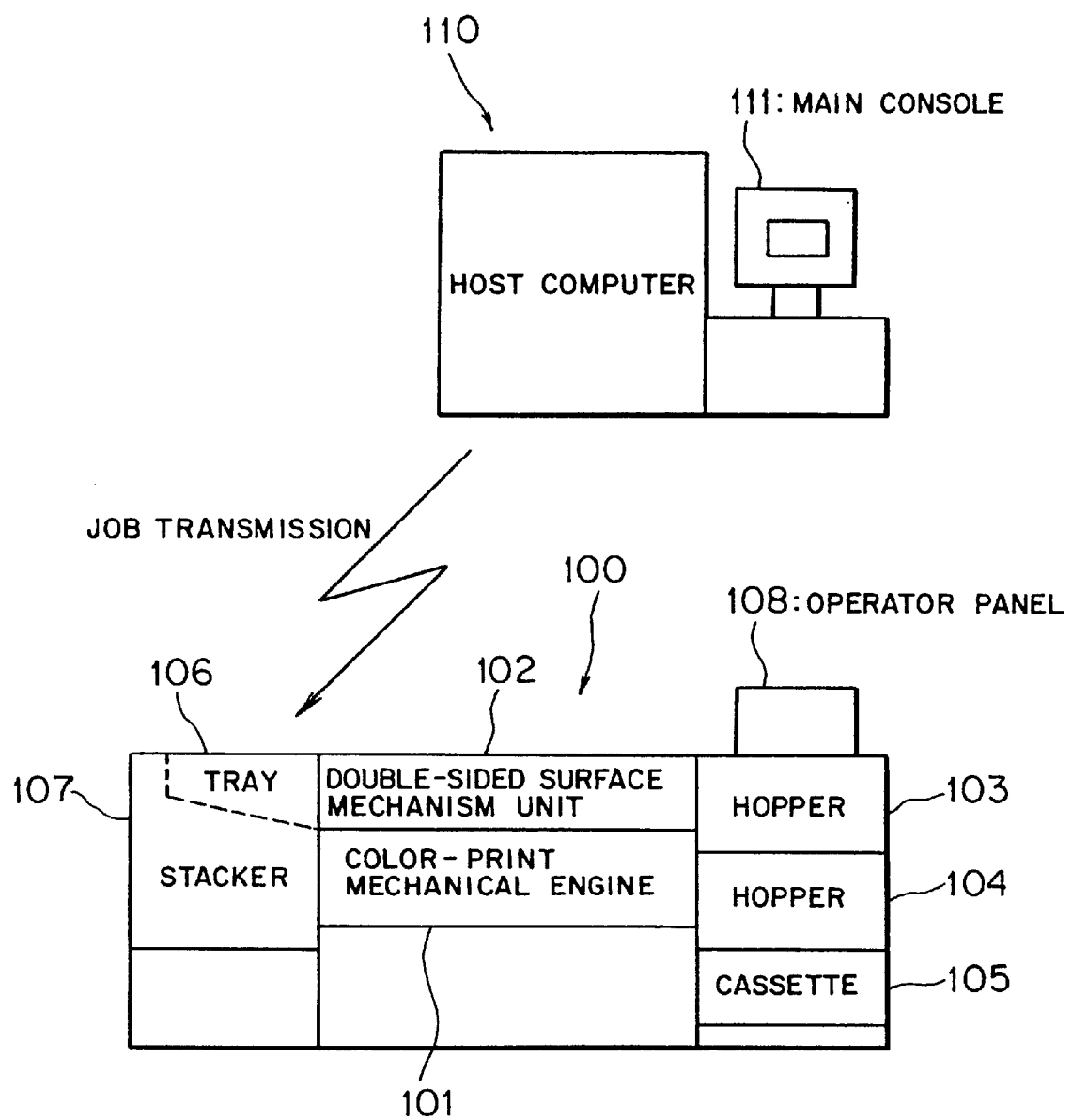
FIG. 22 is a schematic diagram illustrating the outline of a general printer.
Figure 23:
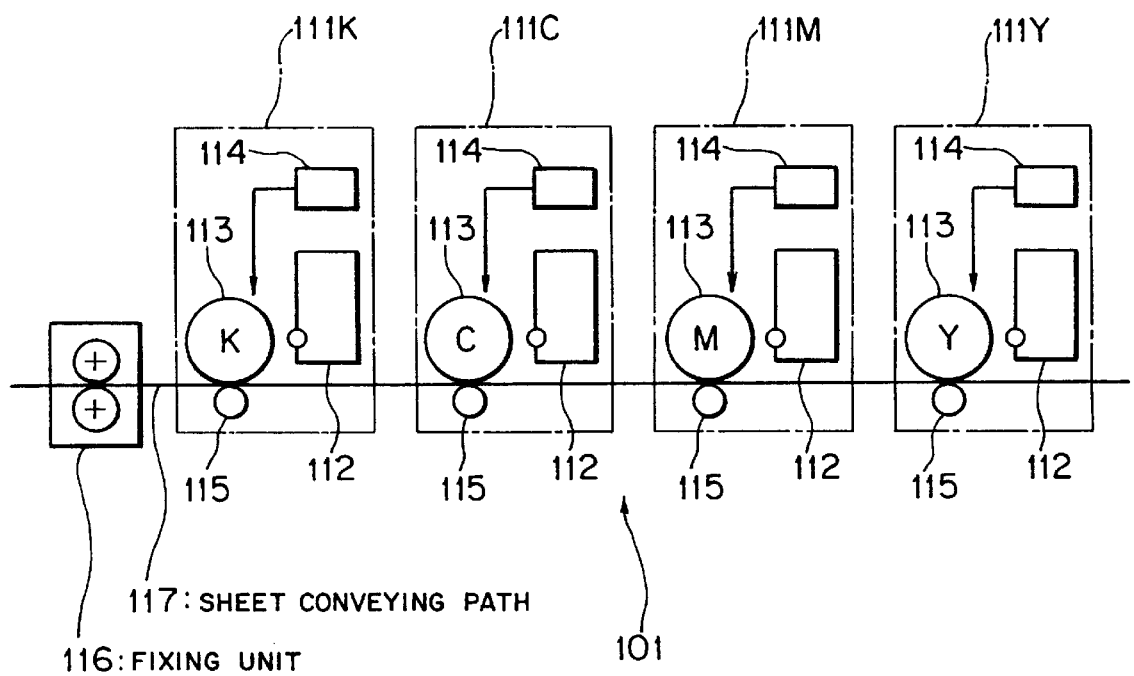
FIG. 23 is a schematic diagram illustrating the internal configuration of a color-print mechanical engine.

FIG. 2 is a block diagram showing a color printer according to an embodiment of the present invention. The color printer 5 shown in FIG. 2 has nearly the same in configuration as the color printer (refer to numeral 100) shown in FIG. 22. That is, the color printer 5 according to the present embodiment is connected to an upper interface unit 30 such as a host computer. The color printer 5 prints data on a given sheet in response to data from the upper interface unit 30.

As shown in FIG. 2, the color printer 5 includes a color-print mechanical engine unit 20, a control unit 10, and an operation panel 29 on which an operator inputs externally various instructions to set various operation states of the color printer 5.

The color-print mechanical engine unit 20 is a mechanism which executes a color printing on a predetermined sheet. The color-print mechanical engine unit includes four independent color printing units 21Y, 21M, 21C and 21K, switching mechanisms 26Y, 26M, 26C and 26K, a fixing unit 27, and a sheet conveying path 28.

In order to perform a color printing by overlaying plural colors, the color printing unit 21Y prints in yellow (Y) on a print sheet; the color printing unit 21M prints in magenta (M) on a print sheet; the color printing unit 21C prints in cyan (C) on the print sheet; and the color printing unit 21K prints in black (B) on the print sheet. Each color printing unit includes a developing unit 22, a photosensitive body (transfer drum) 23, an optical system unit 24, and a transfer roller 25. The elements 22 to 25 forming each of the color printing units 21Y, 21M, 21C and 21K are very general. Hence the details will be omitted here.

The switching mechanism 26Y switches the condition of the color printing unit 21Y either to a return state in which the color printing unit 21Y prints on a print sheet or an evacuation state in which the color printing unit 21Y does not contacts directly to the print sheet. The switching mechanism 26M switches the condition of the color printing unit 21M either to the return state or evacuation state. The switching mechanism 26C switches the condition of the color printing unit 21C either to the return state or evacuation state. The switching mechanism 26K switches the condition of the color printing unit 21K either to the return state or evacuation state. The switching mechanisms 26Y, 26M, 26C and 26K are respectively connected to the color printing units 21Y, 21M, 21C and 21K.

The switching mechanisms 26Y, 26M, 26C and 26K have the respective structures shown in FIGS. 3 to 5 (to be described later). Each of the switching mechanisms 26Y, 26M, 26C and 26K switches the evacuation/return mode of each of the color printing units 21Y, 21M, 21C, and 21K according to the print instruction from the control unit 10.

The control unit 10 receives print data and commands from the upper interface unit 30 and controls a color-print mechanical engine unit 20 to print data from the upper interface unit 30 according to the print condition and print instruction input and set from an operator via the operation panel 29.

The control unit 10 consists of a data processing unit 11, an apparatus control unit 12, a panel control unit 13, a plot processing unit 14, a color-printing-unit control unit 15, a print control unit 16, a working memory 17, and a bit-map memory 18.

Figure 8:
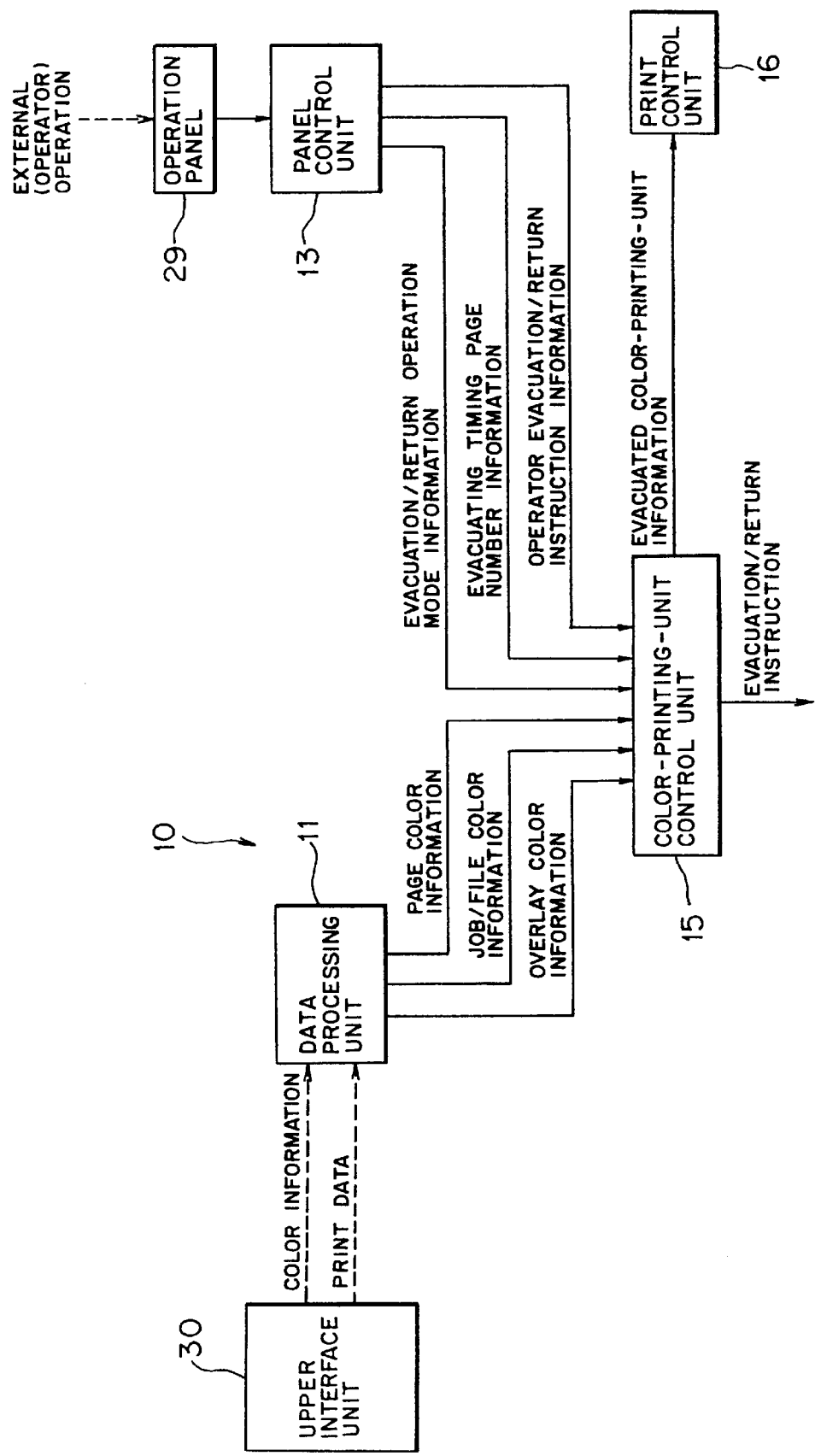
FIG. 8 is a block diagram showing the flow of various kinds of information regarding the evacuation/return operation of the color printing unit according to the present embodiment.

The data processing unit 11, as shown in FIG. 8, receives print data and color information each regarding character, figure, image overlay (to be described later), or others from the upper interface unit 30, analyzes a color to be used for printing the print data among yellow (Y), magenta (M), cyan (C), and black (K) according to the color information, and then transfers color information of the analysis result and an expansion and plotting request of the print data to the plot processing unit 14. The data processing unit 11 sends page color information, job/file color information and overlay color information (to be described later with reference to FIGS. 8 to 11) to the color-printing-unit control unit 15, according to the analysis result. The apparatus control unit 12 comprehensively controls and manages the color printer 5.

The panel control unit 13 analyzes input information input with various setting switches (not shown) arranged on the operation panel 29, informs various control units 12, 15 and 16 of the result, and controls the state of a message displayed on the display unit (not shown) on the operation panel 29. The panel control unit 13 communicates with an operator via the operation panel 29. In the present embodiment, the panel control unit 13 informs the color-printing-unit control unit 15 of evacuation/return operation mode information, evacuating timing page number information, and operator evacuation/return instruction information (to be described later by referring to FIGS. 8 and 12 to 14), input and set by an operator via the operation panel 29.

The plot processing unit 14 expands and plots the print data requested for expansion and plot from the data processing unit 11 on the bit-map memories 18 for yellow (Y), magenta (M) and cyan (C) and black (K), according to the color information.

The color-printing-unit control unit 15 outputs the evacuation/return instruction to the switching mechanisms 26Y, 26M, 26C and 26K in the color-print mechanical engine unit 20, based on various information (information from the data processing unit 11 or panel control unit 13) (to be described later with FIGS. 8 to 14), according to the flowcharts shown in FIGS. 16 to 21. The color-printing-unit control unit 15 judges as an unused color a color satisfying a predetermined unused condition (to be described later) among yellow (Y), magenta (M), cyan (C) and black (K) and then controls the switching operation of the switching mechanisms 26Y, 26M, 26C and 26K arranged respectively to the color printing units 21Y, 21M, 21C and 21K to switch any one of the color printing units 21Y, 21M, 21C and 21K corresponding to the unused color to the evacuation state.

The color-printing-unit control unit 15 according to the present embodiment executes one of the page unit timing evacuation/return process mode (first mode), job/file timing evacuation/return process mode (second mode), operator setting timing evacuation/return process mode (third mode) and overlay print timing evacuation/return process mode (fourth mode) according to the evacuation/return operation mode information input from the operation panel 29 via the panel control unit 13.

Figure 17:
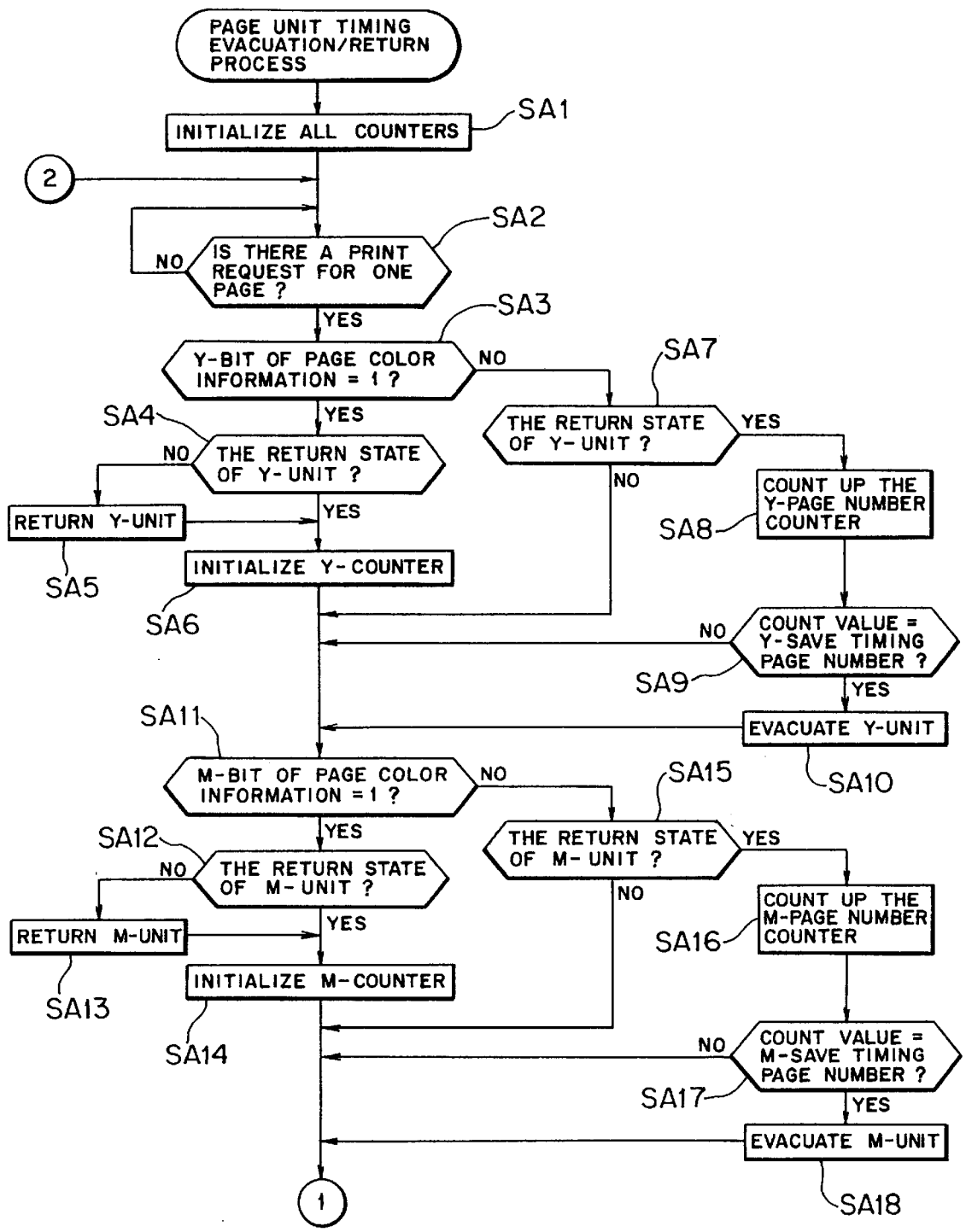
FIG. 17 is a flowchart used for explaining a page unit timing evacuation/return process in a first mode of the present embodiment.
Figure 18:
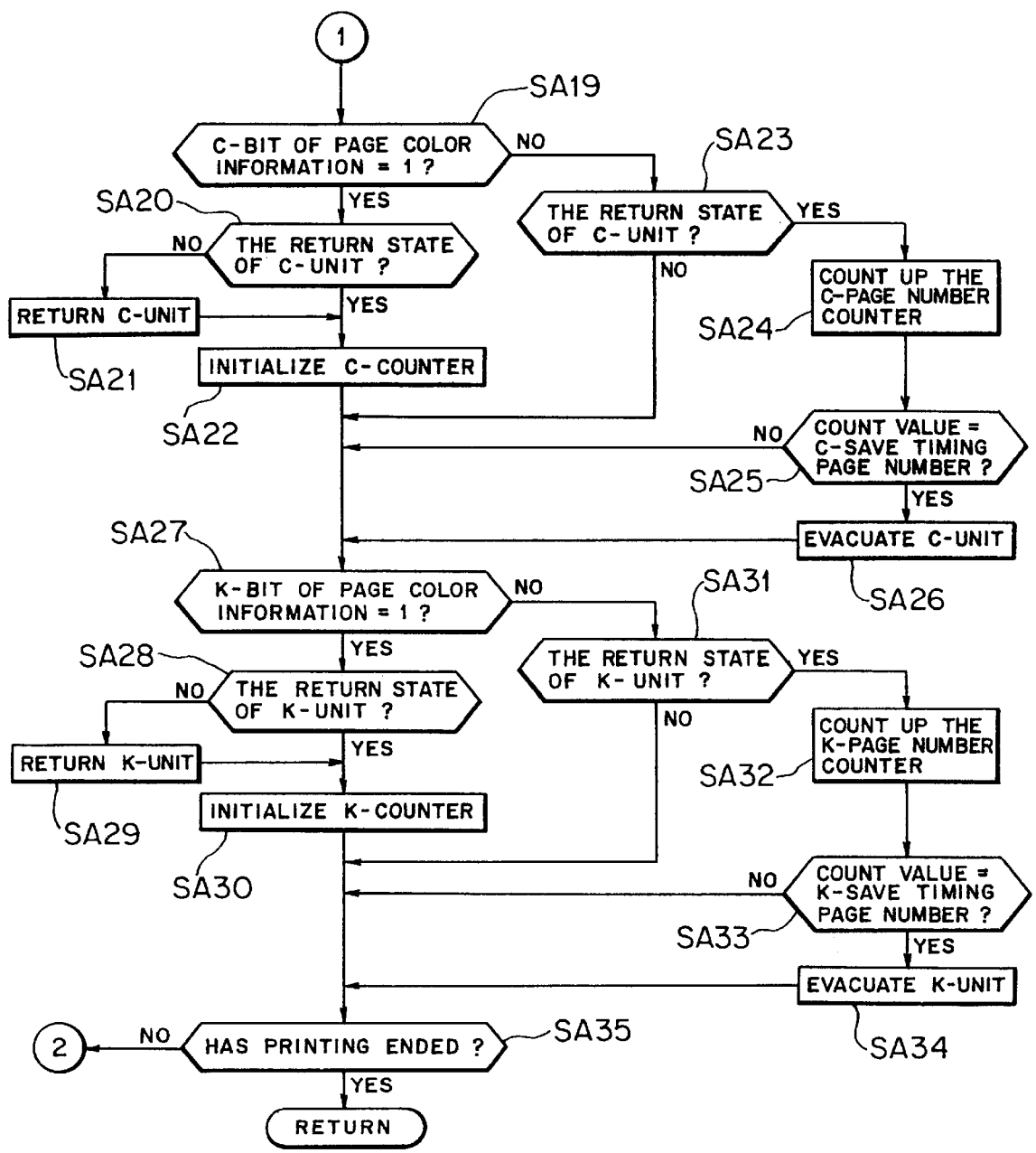
FIG. 18 is a flowchart used for explaining a page unit timing evacuation/return process in a first mode of the present embodiment.

The page unit timing evacuation/return process mode (first mode) is a mode executing the procedure (to be described later with FIGS. 17 and 18). In the first mode, the predetermined unused condition corresponds to a color which is never used while a color printing is continuously performed on print sheets by a specified page number. The color-printing-unit control unit 15 controls the switching operation of each of the switching mechanisms 26Y, 26M, 26C and 26K when a page to be color-printed by using one of the color printing units 21Y, 21M, 21C and 21K switched to the evacuation state appears, to switch the condition of each of the color printing units 21Y, 21M, 21C and 21K from the evacuation state to the return state. The specified page number is set to each of the color printing units 21Y, 21M, 21C and 21K (each color) according to the evacuating timing page number information input from the operation panel 29 via the panel control unit 13.

The job/file timing evacuation/return process mode (second mode) is a mode executing the procedure (to be described later with FIG. 19). In the second mode, the predetermined unused condition corresponds to a color which is judged as one which is never used during printing data, based on the color information received prior to the data of the print job or print file from the upper interface unit 30.

Figure 20:
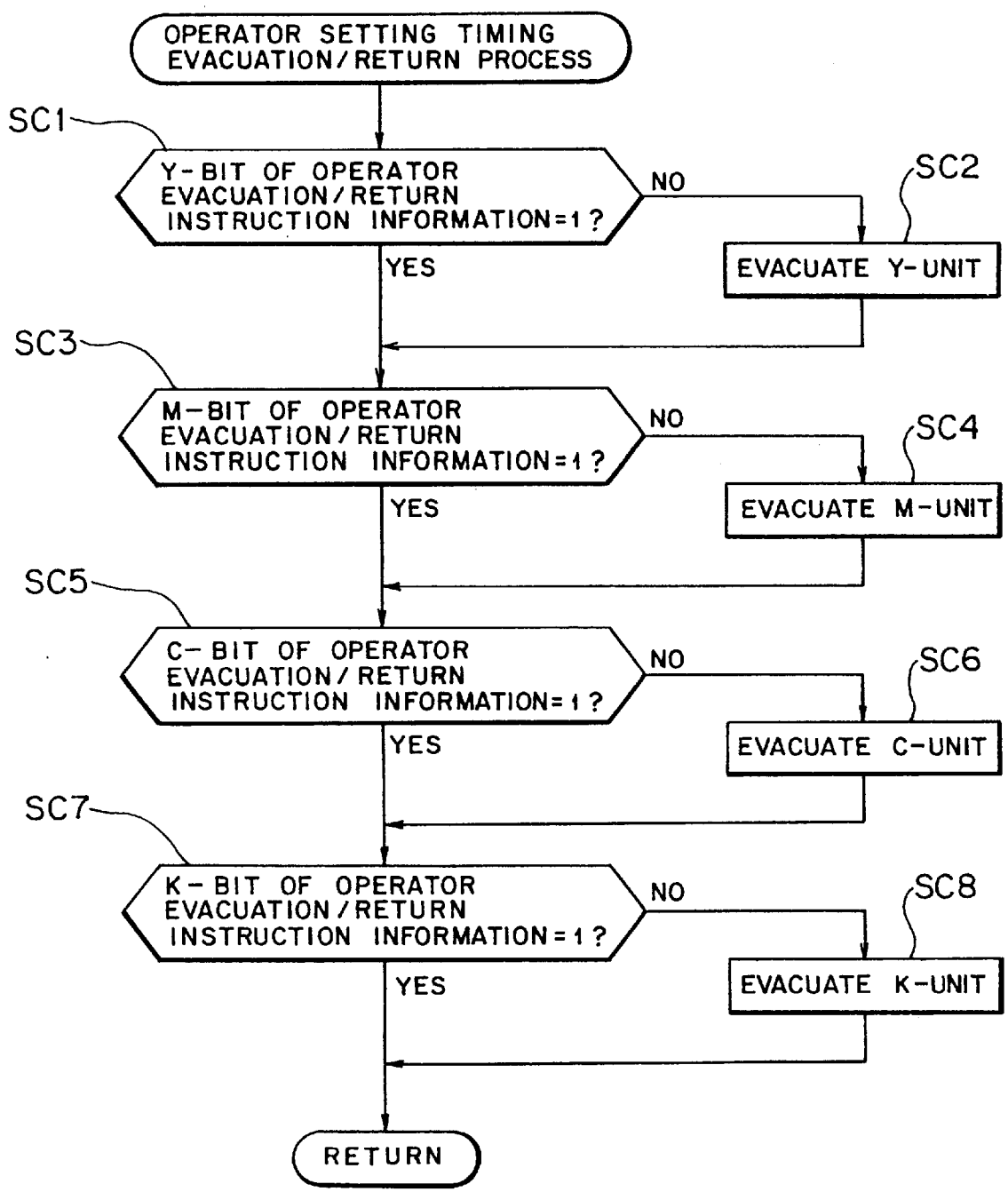
FIG. 20 is a flowchart used for explaining an operator setting timing evacuation/return process in a third mode of the present embodiment.

The operator setting timing evacuation/return process mode (third mode) is a mode executing the procedure (to be described later with FIG. 20). In the third mode, the predetermined unused condition corresponds to a color which is designated as an operator evacuation/return instruction information by the operation panel 29 via the panel control unit 13.

Figure 21:
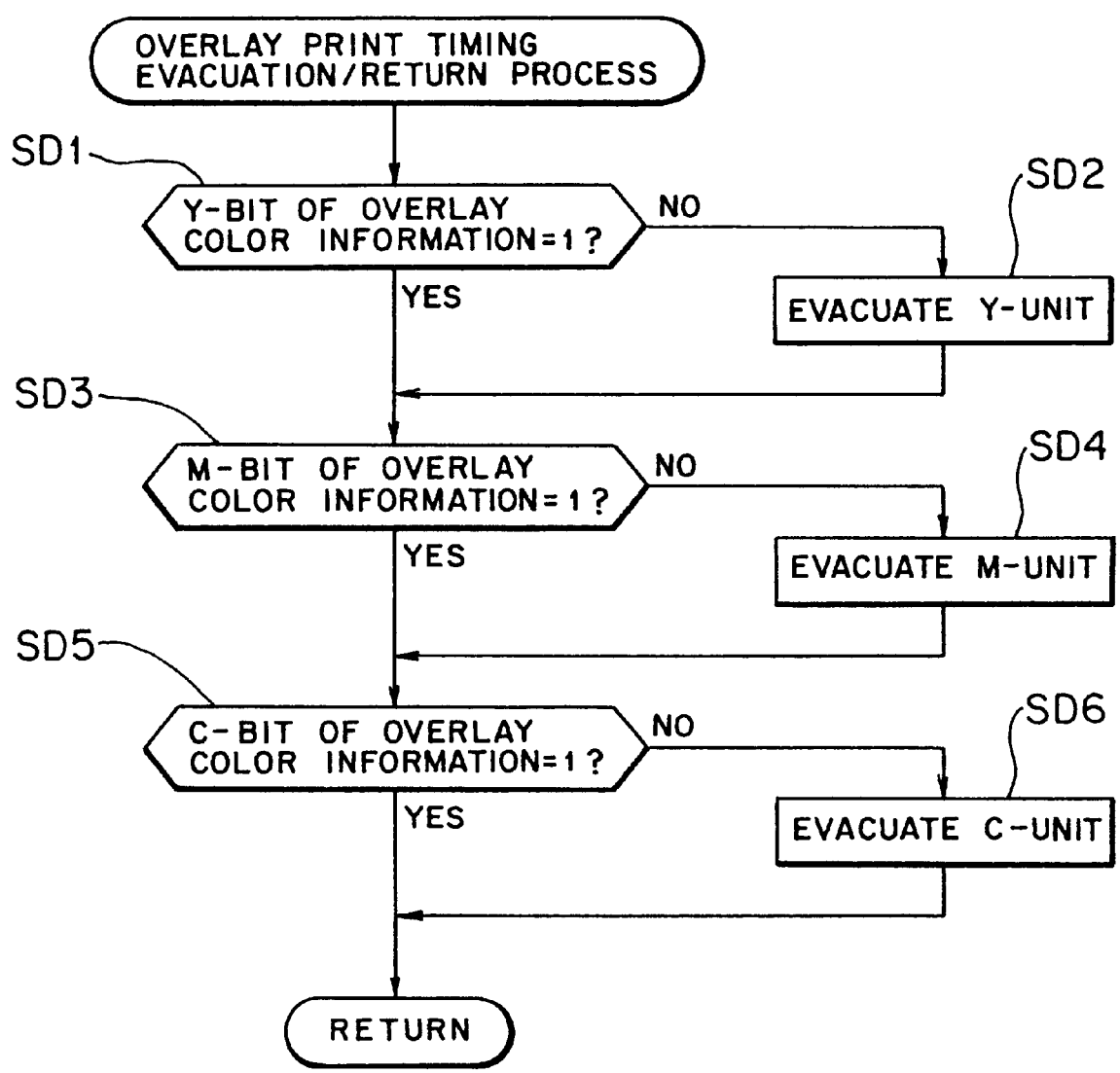
FIG. 21 is a flowchart used for explaining an overlay print timing evacuation/return process in a fourth mode of the present embodiment.

The overlay print timing evacuation/return process mode (fourth mode) is a mode executing the procedure (to be described later with FIG. 21). In the fourth mode, the predetermined unused condition corresponds to a color which is judged as one which is never used during an overlay printing operation according to the overlay color information received prior to an overlay print request from the upper interface unit 30.

The color-printing-unit control unit 15 can operate similarly even when there are plural unused colors and plural color printing units corresponding to unused colors.

The color-printing-unit control unit 15 can also inform the print control unit 16 of evacuated color-printing-unit information (refer to FIG. 15) being information showing a color printing unit in an evacuation state.

The print control unit 16 transfers print image data corresponding to yellow (Y), magenta (M), cyan (C) or black (R) to the color-print mechanical engine unit 20 according to the evacuated color-printing-unit information output from the color-printing-unit control unit 15 and bit-map information on yellow (Y), magenta (M), cyan (C) or black (K) developed and plotted by means of the plot processing unit 14 to control the printing operation of the color-print mechanical engine unit 20.

The working memory 17 acts as a buffer which temporarily stores a control table used for various controls of the color printer 5 and print data from the upper interface unit 30. The working memory 17 also stores various data necessary for analysis of print data such as character font information [APTAN file, ATT (Alphanumeric Translation Table), KTT (Kanji Translation Table), merge rules, and the like], various conditions input and set from the operation panel 29, and the like.

Moreover, the bit-map memory 18 is arranged for a primary color being black (K), yellow (Y), magenta (M) or cyan (C). The plot processing unit 14 expands and plots print image data for each color on the bit-map memory 18.

In the control unit 10, the data processing unit 11, the apparatus control unit 12, the panel control unit 13, the plot processing unit 14, the color-printing-unit control unit 15, the print control unit 16, the working memory 17 and the bit-map memory 18 are mutually connected via the bus 19 such as the control bus and data bus.

The operation panel 29, as described before, receives externally various instructions by an operator to set various operation modes of the color printer 5 The operation panel 29 functions as the page number setting unit, the unused color designating unit, and the mode designating unit.

That is, the function of the page-number setting is used to set externally a specified page (information on an evacuating timing page number) corresponding to an unused condition for each of the color printing units 21Y, 21M, 21C and 21K when a page unit timing evacuation/return process mode is selected.

The function of the unused color designating unit, as described before, is used to designate externally an unused color as an operator evacuation/return designation information at the operator setting timing evacuation/return process mode selection (or when an unused color is recognized previously).

Moreover, the function of the mode designating unit is to designate externally as evacuation/return operation mode information any one of four modes including the first mode to the fourth mode related to the predetermined unused condition.

Next, the evacuation/return switching operation of each of the color printing units 21Y, 21M, 21C and 21K in the color-print mechanical engine unit 20 will be explained below by referring to FIGS. 3 to 7.

The switching mechanism 26Y performs the evacuation/return switching operation of the color printing unit 21Y. The switching mechanism 26M performs the evacuation/return switching operation of the color printing unit 21M. The switching mechanism 26C performs the evacuation/return switching operation of the color printing unit 21C. The switching mechanism 26K performs the evacuation/return switching operation of the color printing unit 21K.

Figure 3:
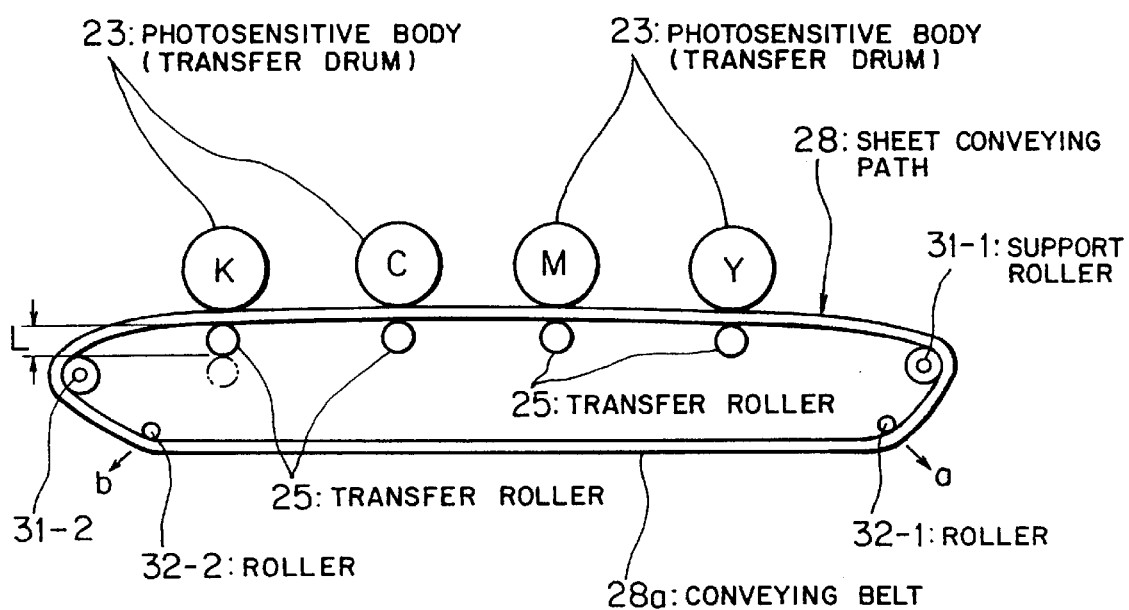
FIG. 3 is a diagram illustrating the sheet conveying path and adjacent portions thereof arranged in a color-print mechanical engine unit, according to the present embodiment.

FIG. 3 illustrates the sheet conveying path 28 and its adjacent portion in the color-print mechanical engine unit 20. FIG. 4 illustrates the sheet conveying path 28 and its adjacent portion in the color-print mechanical engine unit 20.

As shown in FIG. 3, the photosensitive body (transfer drum) 23 of each of the color printing units 21Y, 21M, 21C and 21K is arranged on the upper portion of the sheet conveying path 28. Four transfer rollers 25 are arranged on the lower portion of the sheet conveying path 28.

The sheet conveying path 28 is formed of a conveying belt 28a conveying sheets. The conveying belt 28a is wound on the outer periphery of the support rollers 31-1 and 31-2 and tension applying rollers (tensions) 32-1 and 32-2 in an endless form. Four photosensitive bodies 23 are arranged on the outer top of the conveying belt 28a. Four transfer rollers 25 are arranged on the back side of the conveying belt 28a at the place where four photosensitive bodies 23 are arranged so as to confront four photosensitive bodies 23. In order to absorb the slack of the conveying belt 28a, the roller 31-1 tensions the conveying belt 28a outward (that is, in the direction a in FIG. 3) by means of a spring mechanism (not shown) and the roller 31-2 tensions the conveying belt 28a outward (that is, in the direction b in FIG. 3) by means of a spring mechanism (not shown).

Figure 4:
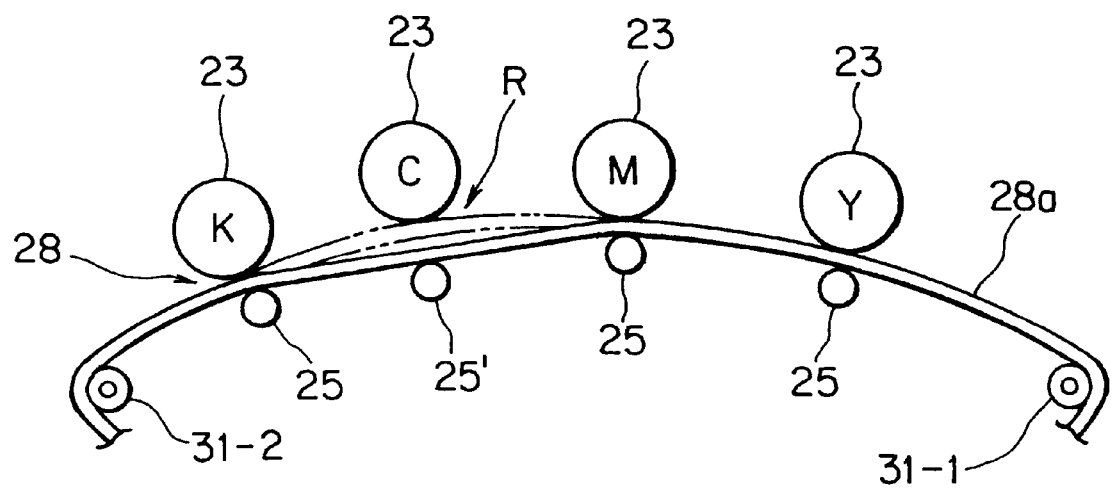
FIG. 4 is a diagram illustrating the sheet conveying path and adjacent portions thereof arranged in a color-print mechanical engine unit, according to the present embodiment.

The transfer roller 25 descends, for example, by the distance L (shown in FIG. 3) through the switching operation of the switching mechanisms 26Y, 26M, 26C and 26K (FIG. 4 shows the transfer roller lowered by 25').

Actually, as shown in FIG. 4, the transfer rollers 25 are arranged to make the upper portion of the endless conveying belt 28a in a gentle arc form. With the transfer roller 25' in a lowered state, the portion R where a transfer roller 25' contacts with the conveying belt 28a descends as shown with the solid lines because of the tension of the conveying belt 28a. Therefore the photosensitive body 23 confronting the transfer roller 25' is separated from the sheet conveying path 28 in an evacuation state (in which the color printing unit 21C confronting the transfer roller 25' is not directly contacted with the print sheet as shown in FIG. 4). In order to clarify the arc form of the conveying belt 28a, FIG. 4 shows the state where the photosensitive bodies 23 and the transfer rollers 25 are arranged to bend extremely the conveying belt 28a in an arc form.

When the transfer roller 25' at a lowered position elevates, the lowered portion R elevates to the original position. Thus the photosensitive body 23 confronting the transfer roller 25' becomes the return state in which it contacts directly with the conveying belt 28 or sheet (that is, the state in which the color printing unit prints on the print sheet).

Moreover, the concrete structure of each of the switching mechanisms 26Y, 26M, 26C and 26K as well as the switching operation (the ascent/descent drive operation) of the transfer roller 25 in each of the switching mechanisms 26Y, 26M, 26C and 26K will be explained below with reference to FIG. 5.

Figure 5:
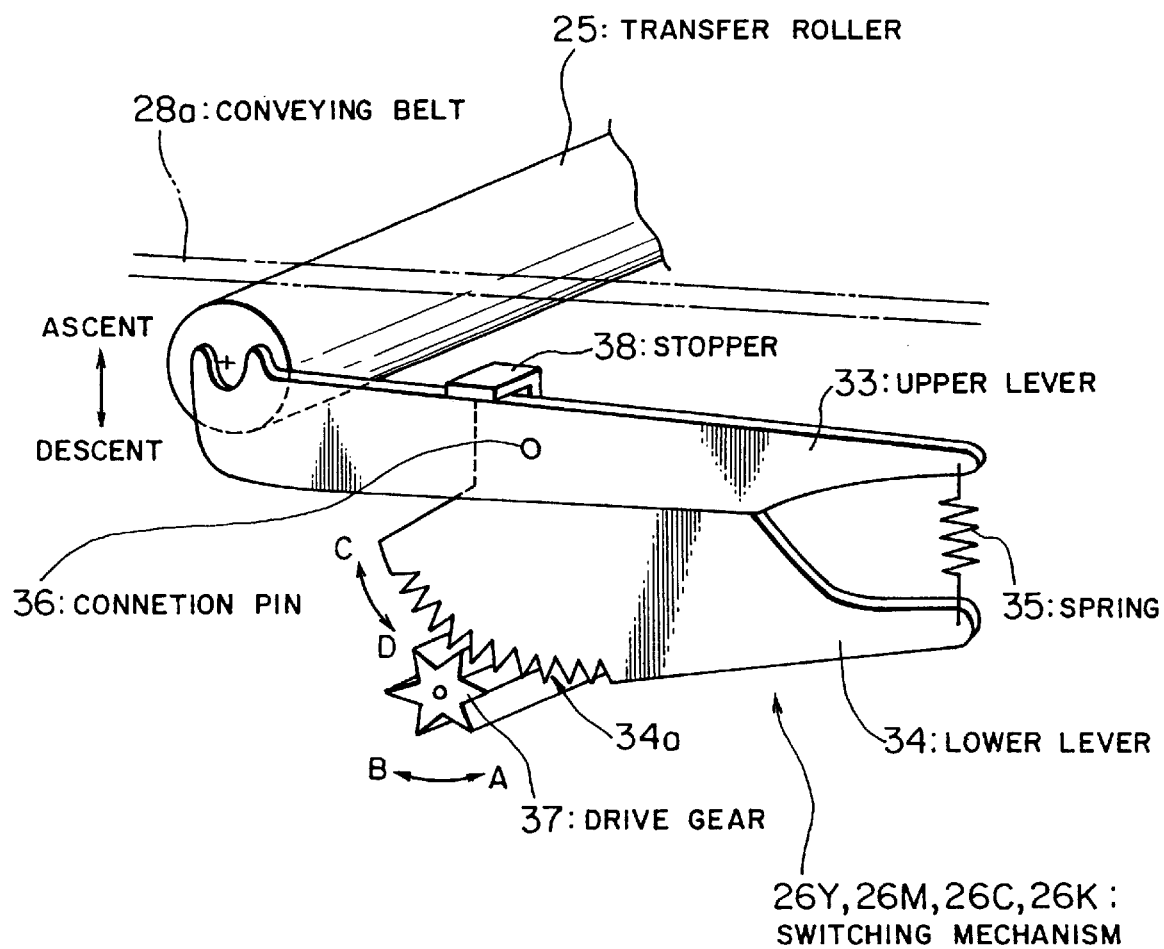
FIG. 5 is a diagram used for explaining the switching operation of a transfer roller in the switching mechanism according to the present embodiment.

As shown in FIG. 5, in each of the switching mechanisms 26Y, 26M, 26C and 26K which lifts and lowers the transfer roller 25 of each of the color printing units 21Y, 21M, 21C and 21K, the mechanisms each which is formed of an upper lever 33, the lower lever 34, the spring 35 and the drive gear are arranged across the transfer roller 25.

The upper lever 33 and the lower lever 34 which are coupled mutually and rotatably with the connection pin 36 are mounted on the color printer body. One end of the upper lever 33 is rotatably supported at the end of the transfer roller 25.

The other end of the upper lever 33 is coupled with the other end of the lower lever 34 via the spring 35. The spring 35 biases the upper lever 33 to press the transfer roller 25 against the photosensitive body 23. When the print sheet is fed between the photosensitive body 23 and the transfer roller 25 and along the conveying belt 28a, the upper lever 33 rotates around the connection pin 36 by overcoming the bias force of the spring 35 and then the transfer roller 25 descends somewhat. This operation absorbs the thickness of the print sheet.

A stopper 38 is formed in the lower lever 34. The stopper 38 contacts with the upper surface of the upper lever 33, at the position where the connection pin 36 is arranged across the spring 35. The upper lever 33 in contact with the stopper 38 regulates the rotation of the upper lever 33 caused by the bias force of the spring 35. As a result, it is regulated that the transfer roller 25 presses excessively the photosensitive body 23.

The lower outer fringe of the lower lever 34 is formed in an arc with respect to the center of the connection pin 36. A rack 34a is formed along the arc outer fringe to mesh with the drive gear 37.

The drive gear 37 is rotatably driven in the direction A or B by means of a pulse motor (not shown). The rotation drive force of the drive gear 37 rotates the transfer roller 25, the upper lever 33, the lower lever 34 and the spring 35 around the connection pin 36 in the direction C or D. Thus the transfer roller 25 is driven upward or downward.

In the switching mechanisms 26Y, 26M, 26C and 26K, when the drive gear 37 rotates in the direction B, the lower lever 34 rotates in the direction D. At the same time, the upper lever 33 rotates in the direction D while it is in contact with the stopper 38. Since the transfer roller 25 descends to separate from the photosensitive body 23, the color printing units 21Y, 21M, 21C and 21K become respectively an evacuation state.

When the drive gear 37 rotates in the direction A, the lower lever 34 rotates in the direction C while the upper lever 33 rotates in the direction C with the bias force of the spring 35 applied thereto. Thus, the transfer roller 25 is driven upward. When the transfer roller 25 is lifted at a predetermined position where it is pressed against the photosensitive body 23 with a suitable force, the color printing units 21Y, 21M, 21C and 21K become a return state.

When the switching operation of each of the switching mechanisms 26Y, 26M, 26C and 26K allows a predetermined transfer roller 25 to be lowered, a desired color printing unit 21Y, 21M, 21C or 21K can be set to the evacuation state, not in direct contact with the print sheet. When the switching operation of each of the switching mechanisms 26Y, 26M, 26C and 26K allows a predetermined transfer roller 25 to be lifted to its original position, a desired color printing unit 21Y, 21M, 21C or 21K can be set to the return state in which printing is performed in direct contact with the print sheet.

Figure 6:
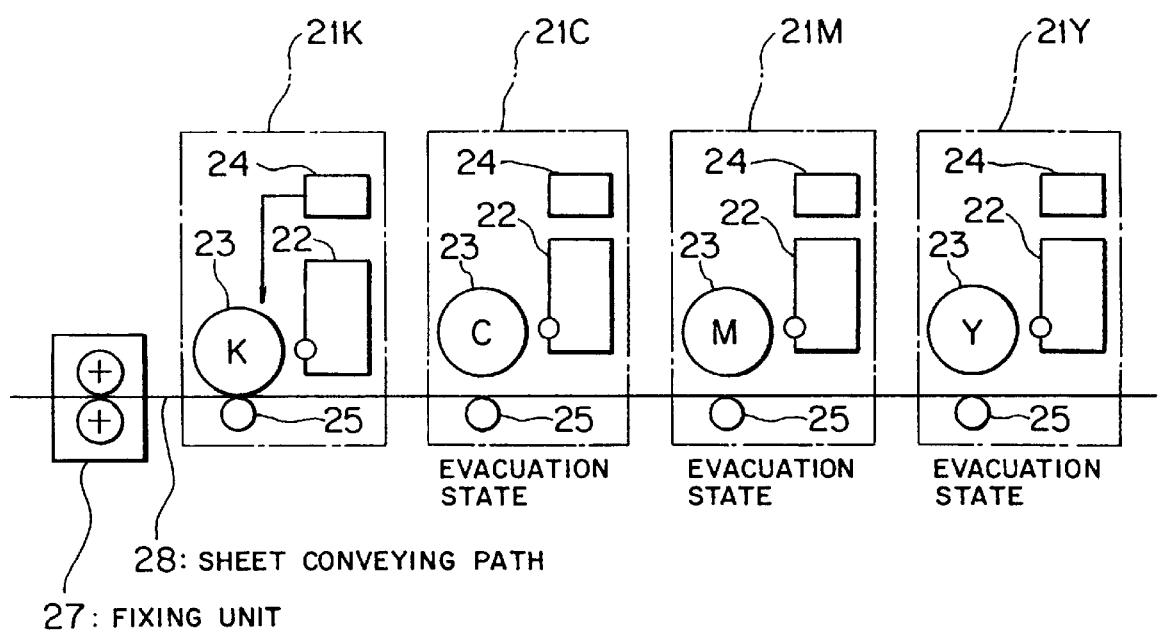
FIG. 6 is a diagram used for explaining the evacuation/return operation of a color printing unit according to the present embodiment.
Figure 7:
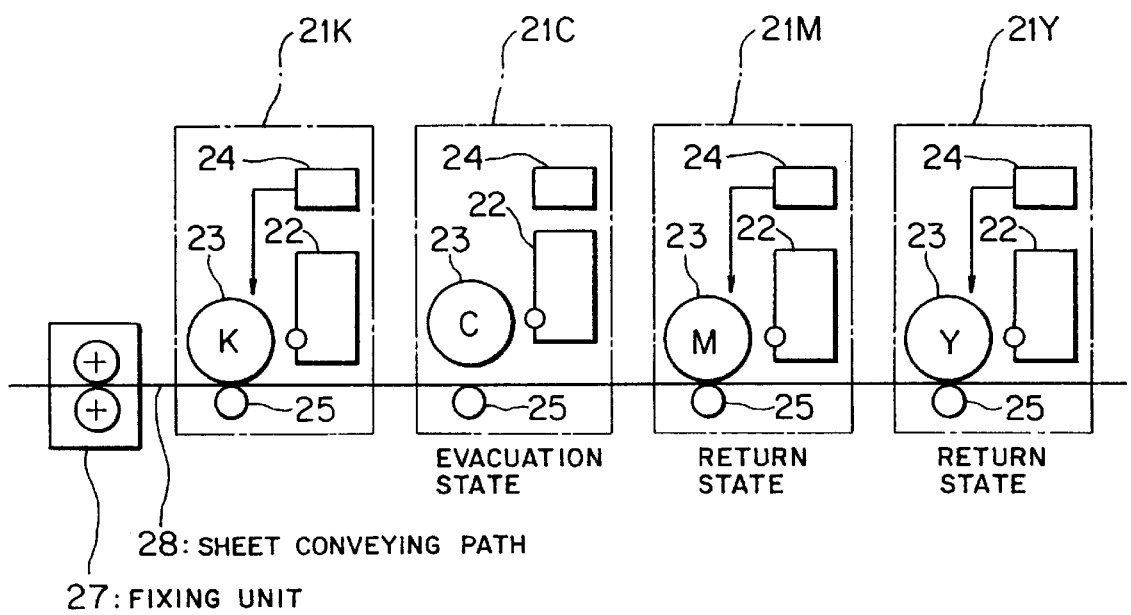
FIG. 7 is a diagram used for explaining the evacuation/return operation of a color printing unit according to the present embodiment.

In the color printing units 21Y, 21M, 21C and 21K performing an evacuation/return operation schematically illustrated, the color printing units 21Y, 21M and 21C in an evacuation state are shown in FIG. 6 and the color printing units 21Y and 21M in an evacuation state are shown in FIG. 7. FIGS. 6 and 7 show the evacuation state in which the developing unit 22, the photosensitive body 23 and the optical unit 24 are in an elevated state. However, according to the present embodiment, the evacuation state is actually realized by moving down the transfer roller 25, as described above.

Since the developing unit 22 and the photosensitive body 23 in each of the color printing units 21Y, 21M and 21C in an evacuation state are separated from the sheet conveying path 28, it is unnecessary to stir the developer in the developing unit 22 and to rotate the photosensitive body 23 even at a printing operation. Hence, it can be prevented that the photosensitive body 23 in a color printing unit with a low use frequency is wasted and that the developer used in the color printing unit is deteriorated. As a result, the serviceable life of the color printing unit with a low use frequency can be prolonged.

In order to perform the evacuation/return switching operation of the color printing units 21Y, 21M, 21C and 21K, the color-printing-unit control unit 15 in the control unit 10 controls the switching mechanisms 26Y, 26M, 26C and 26K according to various kinds of information from the data processing unit 11 and the panel control unit 13 in the control unit 10.

The flow of various kinds of information regarding the evacuation/return operation of each of the color printing units 21Y, 21M, 21C and 21K is shown in FIG. 8.

As shown in FIG. 8, the data processing unit 11 in the control unit 10 converts the color information from the upper interface unit 30 into any one of page color information, job/file color information and overlay color information and then inputs the result to the color-printing-unit control unit 15, together with print data.

The panel control unit 13 converts information input by an operator via the operation panel 29 into evacuation/return operation mode information, evacuating timing page number information and operator evacuation/return instruction information according to input information and then inputs the result to the color-printing-unit control unit 15.

Moreover, the color-printing-unit control unit 15 inputs the evacuated color-printing unit information obtained based on the various kinds of input information, to the print control unit 16.

Figure 9:
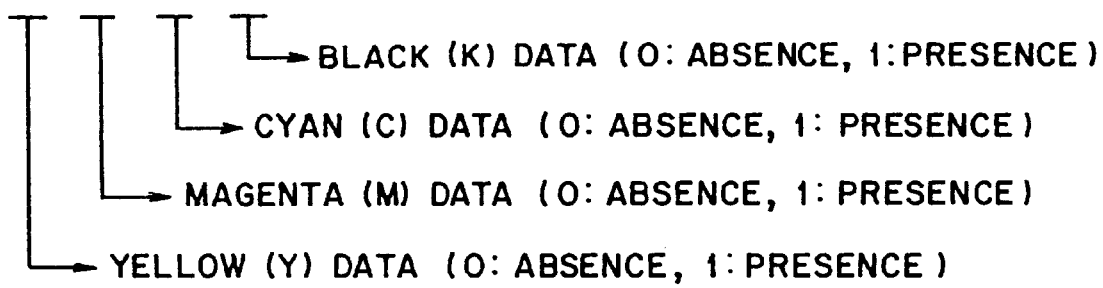
FIG. 9 is a diagram showing page-color information according to the present embodiment.

The page color information is color information for each page at the first-mode setting time. The page color information is 4-bit data representing the presence or absence of data corresponding to yellow (Y), magenta (M), cyan (C) or black (K) for each page, as shown in FIG. 9. The information is represented as "0" when there is no data corresponding to each color and as "1" when there is data corresponding to each color.

Figure 10:
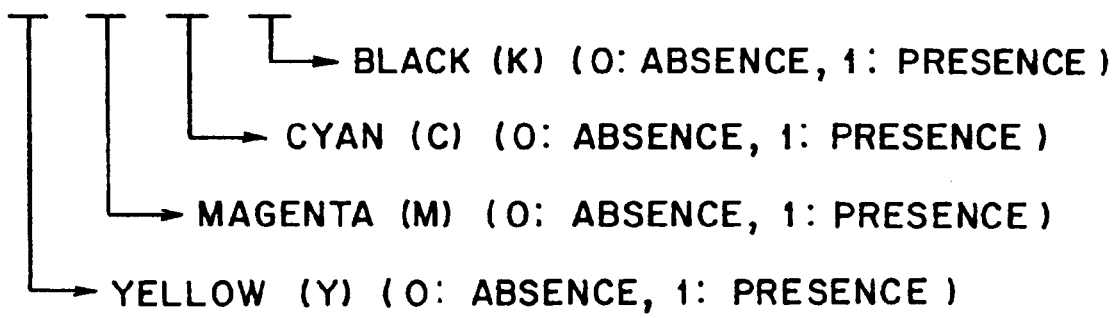
FIG. 10 is a diagram showing job/file color information according to the present embodiment.

The job/file color information is color information in a job or file unit used at the second mode setting time and is 4-bit data representing a use or no use of a color in yellow (Y), magenta (M), cyan (C) or black (K) in a job or file unit, as shown in FIG. 10. "0" stands for no use of any color and "1" stands for a use of a color.

Moreover, the overlay color information is overlay color information used at the fourth mode setting time. In the overlay printing, character data are overprinted on ruled lines previously printed on a slip in a predetermined format. The ruled lines in a predetermined format is called an overlay.

Figure 11:
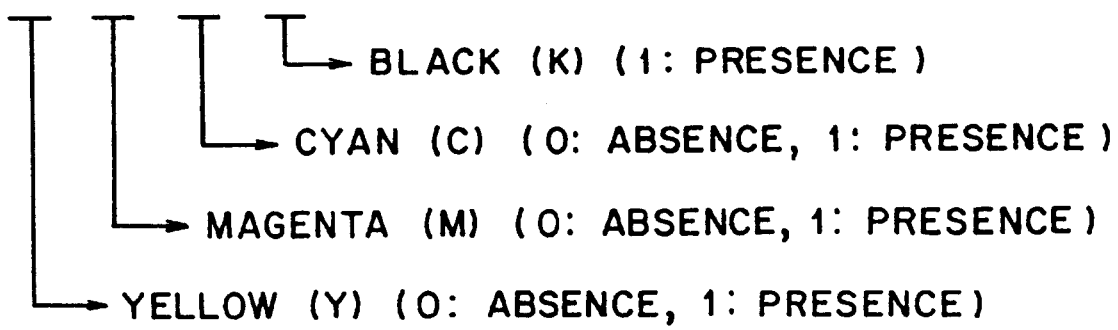
FIG. 11 is a diagram showing overlay-color information according to the present embodiment.

The overlay color information, as shown in FIG. 11, corresponds to 4-bit data representing a use or no use of a color in yellow (Y), magenta (M), cyan (C) or black (K) which is overlaid. "0" represents no use of each color and "1" represents a use of a color. Since character data are usually printed in black in the overlay printing operation, "1" is permanently set to the K-th bit to use always the black (K) in the example shown in FIG. 11. However, in this case, the K-th bit may be omitted.

Figure 12:
FIG. 12 is a diagram illustrating evacuation/return operation mode information according to the present embodiment.
Figure 12:

The evacuation/return operation mode information is set and input through the operation panel 29 and is information which sets any one of the first to fourth modes executes the evacuation/return operation of the color printing units 21Y, 21M, 21C or 21K. As shown in FIG. 12, the case where the evacuation/return operation is not needed is represented as "00" and the case where the evacuation/return operation is needed is represented as "01" to "04".

"01" represents that a page unit timing evacuation/return process mode (first mode) which performs an evacuation/return operation in a page unit is set. "02" represents that a job/file timing evacuation/return process mode (second mode) which performs an evacuation/return operation in a job/file unit is set. "03" represents that an operator setting timing evacuation/return process mode (third mode) which performs an evacuation/return operation arbitrarily set by an operator is set. "04" represents that an overlay print timing evacuation/return process mode (fourth mode) which performs an evacuation/return operation according to an overlay printing is set.

Figure 13:
FIG. 13 is a diagram illustrating evacuating timing page number information according to the present embodiment.

Furthermore, the evacuating timing page number information is set and input from the operation panel 29 and is used at the first mode setting time. The evacuating timing page number information is page number information when the color printing unit 21Y, 21M, 21C or 21K is evacuated or returned. As shown in FIG. 13, the evacuating timing page number (specified page number) is set for the color printing unit 21Y, 21M, 21C or 21K corresponding to yellow (Y), magenta (M), cyan (C) or black (K). A flag of "0" is set when the evacuation control is not needed and a flag of "1" is set when the evacuation control is needed.

In practice, the color printing unit 21Y, 21M, 21C or 21K is evacuated on a 500 to 1000 page basis. The page number is counted using a page number counter (not shown) for yellow (Y), a page number counter (not shown) for magenta (M), a page number counter (not shown) for cyan (C) and a page number counter (not shown) for black (K) each formed in software configuration in the color-printing-unit control unit 15.

Figure 14:
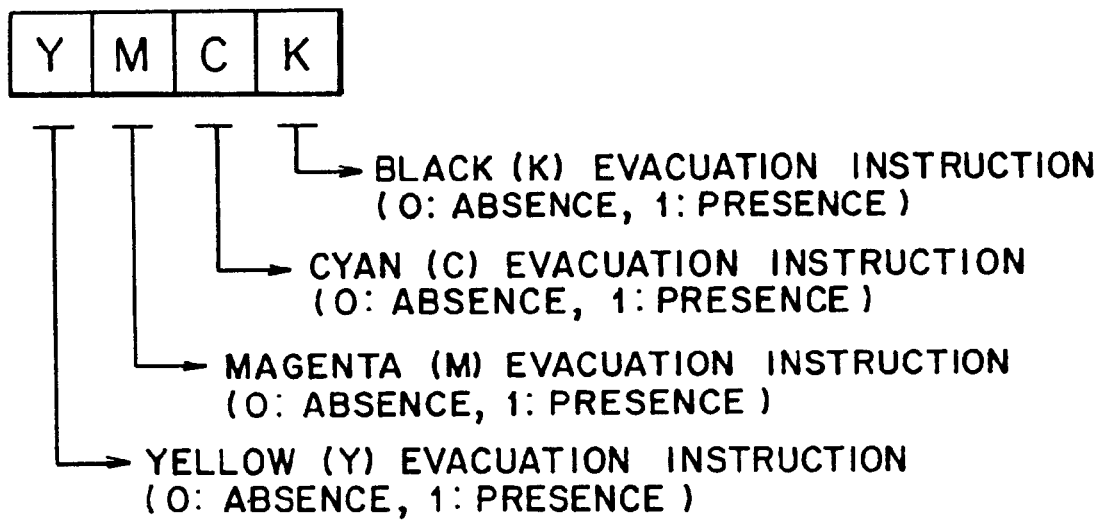
FIG. 14 is a diagram illustrating operator evacuation/return instruction information according to the present embodiment.

The operator evacuation/return instruction information is set and input via the operation panel 29 and is used at the third mode setting time. The operator evacuation/return instruction information represents an evacuation instruction for the color printing unit 21Y, 21M, 21C or 21K arbitrarily set by an operator. As shown in FIG. 14, "0" represents the case where the evacuation instruction is not issued and "1" represents the case where the evacuation instruction is issued.

Figure 15:
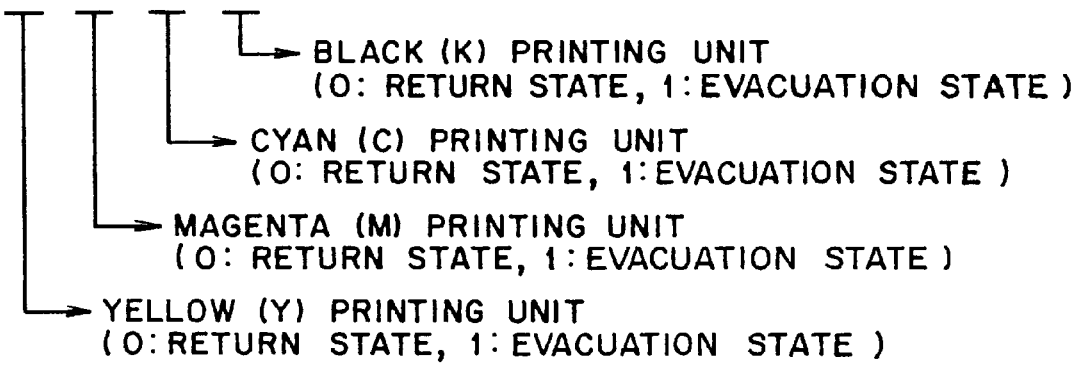
FIG. 15 is a diagram illustrating evacuated color-printing-unit information according to the present embodiment.

The evacuated color-printing-unit information obtained by the color-printing-unit control unit 15 according to various kinds of information and then output to the print control unit 16 is information regarding a color printing unit to be evacuated. As shown in FIG. 15, "0" represents when the color printing unit 21Y, 21M, 21C or 21K is set to a return state and "1" represents when the color printing unit 21Y, 21M, 21C or 21K is set to an evacuation state.

The operation of the color printer 5 with the above-mentioned configuration according to an embodiment of the present invention will be explained below using the flowcharts shown in FIGS. 16 to 21.

Figure 16:
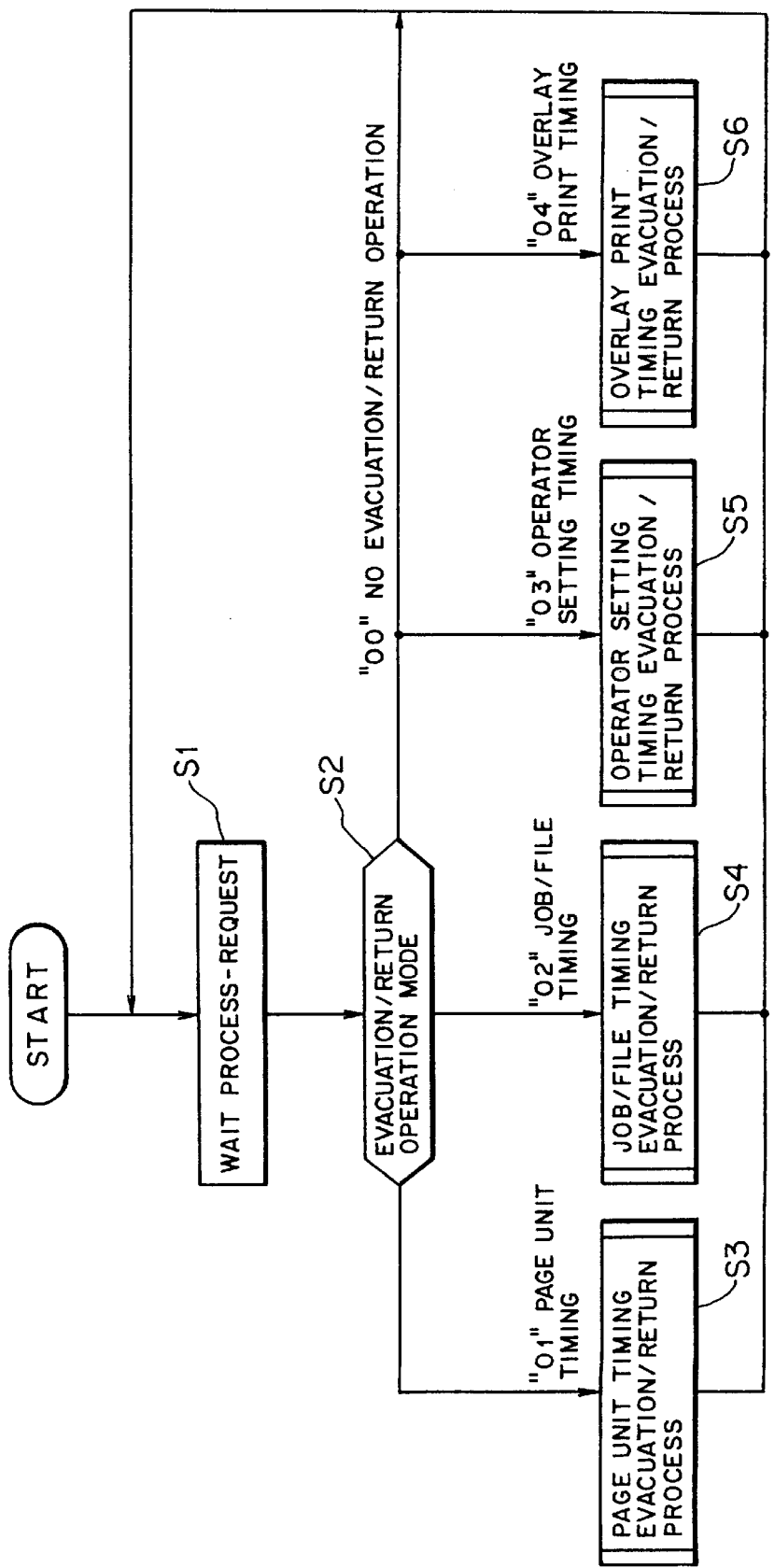
FIG. 16 is a flowchart used for explaining the process of a color printing unit arranged in a color printer according to the present embodiment.

FIG. 16 illustrates roughly the process of the color-printing-unit control unit 15 in the color printer 5.

The color-printing-unit control unit 15 is in an evacuation state till an operator newly inputs or varies the evacuation/return operation mode information from the operation panel 29 via the panel control unit 13 (step S1). When the evacuation/return operation mode information is input or varied, the color-printing-unit control unit 15 judges if the evacuation/return operation mode information corresponds to any one of "00" to "04" (step S2).

When the evacuation/return operation mode information input represents "00" showing no evacuation/return operation required, the color-printing-unit control unit 15 goes back to the step S1 and then remains in a process request wait state.

When the evacuation/return operation mode information represents any one of "01" to "04", the color-printing-unit control unit 15 shifts to the page unit timing evacuation/return process (first mode; step S3), a job/file timing evacuation/return process (second mode: step S4), the operator setting timing evacuation/return process (third mode; step S5) or the overlay print timing evacuation/return process (fourth mode; step S6), according to the information "01" to "04". Then the color-printing-unit control unit 15 again becomes a wait state (step S1).

As described above, since an operator can externally select an evacuation/return operation timing in any one of the first to fourth modes, the color printing units 21Y, 21M, 21C and 21K can operate in the evacuation/return mode suitable for various kinds of printing jobs while securing the print performance.

Moreover, the first to fourth modes will be described below in detail by referring to FIGS. 17 to 21.

First, the page unit timing evacuation/return process (step S3 shown in FIG. 16) in the first mode will be explained with reference to FIGS. 17 and 18.

When the page unit timing evacuation/return process mode is set, the color-printing-unit control unit 15 initializes all the counters (that is, the yellow (Y) page number counter, magenta (M) page number counter, cyan (C) page number counter and black (K) page number counter) (step SA1).

Next, the color-printing-unit control unit 15 judges whether there is a print request for one page (step SA2). The color-printing-unit control unit 15 waits for a print request if there is no print request. When there is a print request, the color-printing-unit control unit 15 judges whether the Y-bit of page color information is "1" (step SA3).

When the Y-bit of the page color information is "1", it is judged whether the yellow (Y) color printing unit 21Y (sometimes referred to as a Y-unit. Similarly, the magenta (M) color printing unit 21M may be referred to as a M-unit; the cyan (C) color printing unit 21C may be referred to as a C unit; and the black (K) color printing unit 21K may be referred to as a K-unit) is in a return state (step SA4). When the Y-unit is not in a return state, the page number counter for the Y-unit is initialized after the return operation of the Y-unit (steps SA5 and SA6).

When the Y-bit of the page color information is not "1", it is judged whether the Y-unit is in a return state (step SA7). If yes, the Y page number counter is counted up by "1" (step SA8) to compare the count value with the evacuating timing page number for the Y-unit (step SA9). The Y-unit is evacuated when the count value agrees with the Y unit evacuating timing page number (step SA10).

Similarly, the M unit (steps SA11 to SA18), C-unit (steps SA19 to SA26) and K-unit (steps SA27 to SA34) perform the operation in the above-mentioned steps SA3 to SA10. Finally, it is judged that the printing operation has been completed (step SA35).

In such a manner, when sheets for a specified number of pages (e.g. 1000 pages) are printed, some of the color printing units 21Y, 21M, 21C and 21K not used are evacuated independently by color. When the page to be printed with the color printing unit 21Y, 21M, 21C or 21K evacuated appears, the corresponding color printing unit can be returned for the printing operation. The evacuation/return operation of the color printing unit 21Y, 21M, 21C or 21K can be performed in constant page number (this page number is variable).

In the present embodiment, the page number at the evacuating timing can be set according to the print-color use frequency for each of the color printing units 21Y, 21M, 21C and 21K. The color printing unit 21Y, 21M, 21C or 21K which is suitable to print jobs and operations can be evacuated/returned while the print performance is maintained.

Next, the job/file timing evacuation/return process (step S4 shown in FIG. 16) will be described below as the second mode, referring to FIG. 19.

When the job/file timing evacuation/return process mode is set, the color-printing-unit control unit 15 judges the presence or absence of use of each of the color printing units 21Y, 21M, 21C and 21K according to the job/file color information and then issues an evacuation instruction to the switching mechanism 26Y, 26M, 26C or 26K mounted on the color printing unit 21Y, 21M, 21C or 21K not used.

Figure 19:
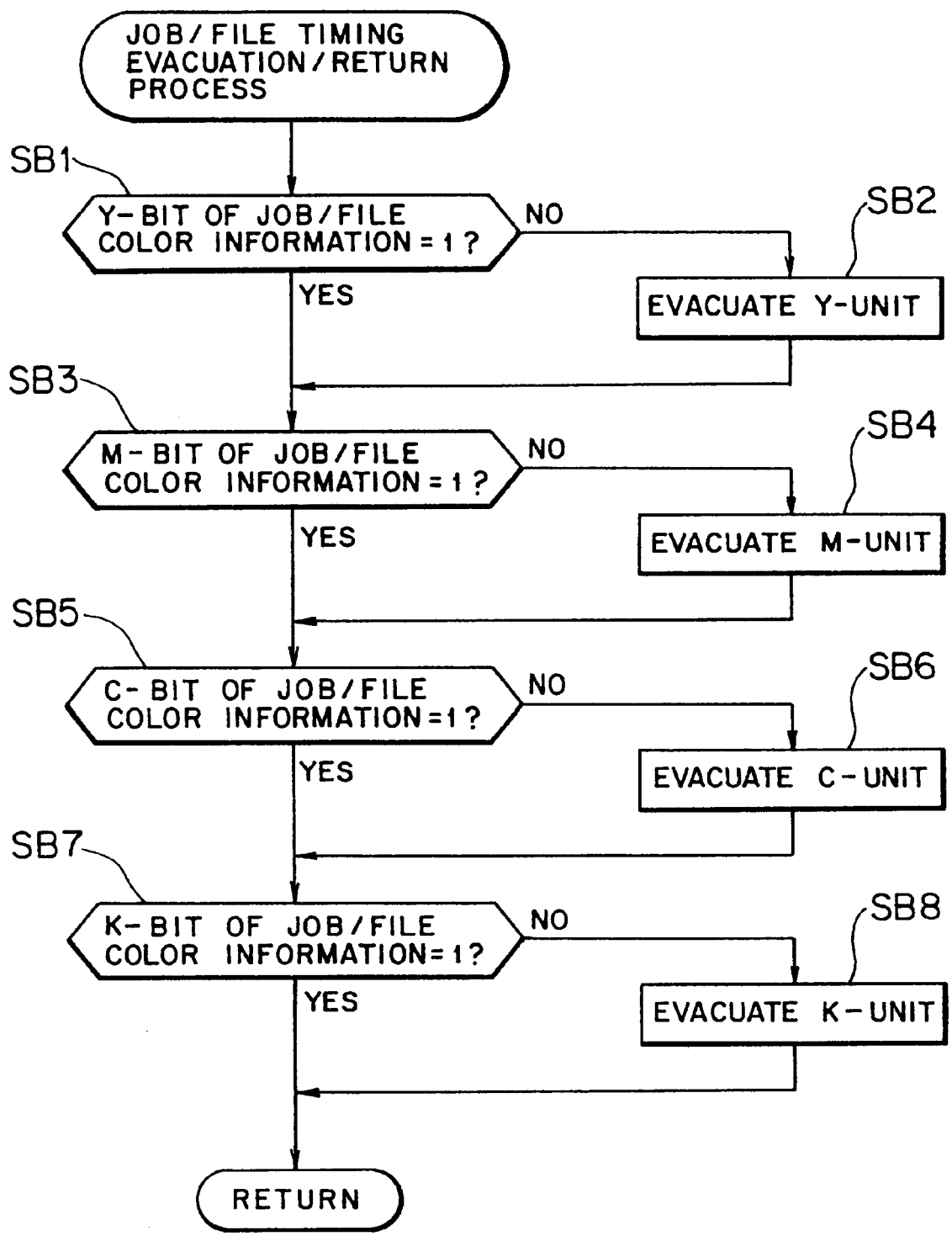
FIG. 19 is a flowchart used for explaining a job/file timing evacuation/return process in a second mode of the present embodiment.

That is, as shown in FIG. 19, the color-printing-unit control unit 15 judges whether the Y-bit of the job/file color information is "1" (step SB1) and then evacuates the Y-unit when the Y-bit of the job/file color information is not "1" (step SB2). Similarly, each of the M-unit (steps SB3 and SB4), C-unit (steps SB5 and SB6) and K-unit (steps SB7 and SB8) is performed in the above-mentioned operation.

When a monochrome printing is performed according to such a process, only the K-unit is used. Thus, the Y-unit, M-unit and C-unit not used are changed in an evacuation state.

In the case of a color printing process, the evacuation control is performed according to the color information used. For example, when black color and red color are used, the K-unit is used for printing in black while the Y-unit and M-unit are used for printing in red (in this case, red color is a mixture of the Y-unit and the M-unit). Hence, only the C-unit is switched to an evacuation state.

As described above, the evacuation/return operation of the color printing unit 21Y, 21M, 21C or 21K is performed on a print job or print file basis by judging the presence or absence of use of the color printing unit 21Y, 21M, 21C or 21K according to job/file color information and evacuating the color printing unit 21Y, 21M, 21C or 21K not used. This enables a high-speed printing compared with the case where the evacuation/return operation is performed in page unit while the printing performance can be maintained.

Furthermore, the third mode, or the operator setting timing evacuation/return process (step S5 shown in FIG. 16), will be explained below by referring to FIG. 20. When the operator setting timing evacuation/return process mode is set, the color-printing-unit control unit 15 judges whether the Y-bit of the operator evacuation/return instruction information is "1" (step SC1). When the Y-bit of the operator evacuation/return instruction information is not "1", the Y-unit is evacuated (step SC2). In the same manner, the M-unit (steps SC3 and SC4), C-unit (steps SC5 and SC6) and K-unit (steps SC7 and SC8) perform the above-mentioned operation.

As described above, an operator externally sets a color to be used or not to be used (or a color printing unit to be used or not to be used) via the operation panel 29 to evacuate the color printing unit 21Y, 21M, 21C or 21K not to be used according to the set information. Hence, the evacuation/return operation suitable for print jobs and print operations can be performed while maintaining the print performance.

When the color printing unit 21Y, 21M, 21C or 21K is failed or toner or developer is out of stock in the color printing unit 21Y, 21M, 21C or 21K, the color printing unit 21Y, 21M, 21C or 21K in a disabled state can be forcibly evacuated in the third mode according to an external designation (such as an operator). Hence the remaining printing unit 21Y, 21M, 21C or 21K can continue the printing job without stopping.

Finally, the overlay print timing evacuation/return process (step S6 shown in FIG. 16) acting as the fourth mode will be explained below by referring to FIG. 21.

In this overlay printing operation, since the K-unit being the black color printing unit is always used in a character printing operation, the Y-unit, M-unit and C-unit perform the evacuation/return operation in the overlay print timing evacuation/return process.

When the overlay print timing evacuation/return process mode is first set, the color-printing-unit control unit 15 judges whether the Y-bit of the overlay color information is "1" (step SD1). If the Y-bit of the overlay color information is not "1", the Y-unit is evacuated (step SD2). The same operation is performed by the M-unit (steps SD3 and SD4) and the C-unit (steps SD5 and SD6).

In such a manner, in an overlay printing in which many color printing operations are expected, the evacuation/return operation suitable for print jobs and print operations is performed, with the printing performance maintained, by judging the color printing unit 21Y, 21M, 21C or 21K not to be used according to the overlay color information and performing the evacuation/return operation of the color printing unit 21Y, 21M, 21C or 21K which is not used in the overlay printing in timing.

As described above, the timing of the evacuation/return operation of each of the color printing units 21Y, 21M, 21C and 21K is set to the time at which a predetermined unused condition is satisfied in the first to fourth modes, not in page unit. Thus the power consumption can be significantly reduced with the print performance maintained while the color printing unit 21Y, 21M, 21C or 21K with a low use frequency and the developer therefor can prolong its serviceable life. In addition, it is certainly prevented that the toner of an unused color adheres as a stain to a sheet so that the printing quality can be improved.

Moreover, since an operator can externally select the evacuation/return operation timing in any one of the first to fourth modes, the evacuation/return operation of the color printing unit 21Y, 21M, 21C or 21K optimum for various printing job modes can be performed with the printing performance maintained.

What is claimed is:

1. A color printer comprising:
   plural color printing units each for printing a print image in a color on a print sheet to perform a color printing by overlaying plural colors, each of said plural color printing units including a developing unit, a photosensitive body, an optical system, and a transfer roller;
   switching mechanisms each for switching the state of each of said printing units to either a return state in which each of said color printing units performs a printing operation on said print sheet or an evacuation state in which each of said color printing units is not directly in contact with the printing sheet, said switching mechanisms being respectively arranged adjacent to said color printing units; and
   a control unit for controlling the switching operation of each of said switching mechanisms;
   said control unit controlling the switching operation of at least one of said switching mechanisms arranged adjacent to said color printing units to switch the state of at least one color printing unit having an unused condition, corresponding to an unused color, to said evacuation state wherein said control unit determines as an unused color a color which is never used during a specified number of consecutively printed sheets.

2. The color printer according to claim 1, wherein said control unit controls the switching operation at least one of said switching mechanisms arranged adjacent to said color printing units when a page is to be color-printed by using said color printing units switched in said evacuation state by means of said switching mechanisms, by returning the state of said color printing units from said evacuation state to said return state.

3. The color printer according to claim 1, further comprising a page number setting unit which externally sets said specified number.

4. The color printer according to claim 2, further comprising a page number setting unit which externally sets said specified number.

5. The color printer according to claim 3, wherein said page number setting unit sets said specified number in every color printing unit.

6. The color printer according to claim 4, wherein said page number setting unit sets said specified number in every color printing unit.

7. The color printer of claim 1, wherein said control unit determines as an unused color of color which is never used during a specified number of consecutively printed sheets by counting a number of consecutive page color information sets in which a color is never used and comparing the counted number with the specified number, said page color information sets corresponding to sheets to be printed.

8. A color printer comprising:

plural color printing units each for printing a print image in a color on a print sheet to perform a color printing by overlaying plural colors, each of said plural color printing units including a developing unit, a photosensitive body, an optical system, and a transfer roller;

switching mechanisms each for switching the state of each of said color printing units to either a return state in which each of said color printing units performs a printing operation on said print sheet or an evacuation state in which each of said color printing units is not directly in contact with the printing sheet, said switching mechanisms being respectively arranged adjacent to said color printing units; and a control unit for controlling the switching operation of each of said switching mechanisms;

said control unit controlling the switching operation of at least one of said switching mechanisms arranged adjacent to said color printing units to switch the state of at least one color printing unit having an unused condition, corresponding to an unused color, to said evacuation state wherein said control unit determines as an unused color a color which is judged as one which is never used during printing data according to color information received prior to print job data or print file data from an upper unit.

9. A color printer comprising:

plural color printing units each for printing a print image in a color on a print sheet to perform a color printing by overlaying plural colors, each of said plural color printing units including a developing unit, a photosensitive body, an optical system, and a transfer roller;

switching mechanisms each for switching the state of each of said color printing units to either a return state in which each of said color printing units performs a printing operation on said print sheet or an evacuation state in which each of said color printing units is not directly in contact with the printing sheet, said switching mechanisms being respectively arranged adjacent to said color printing units; and a control unit for controlling the switching operation of each of said switching mechanisms;

said control unit controlling the switching operation of at least one of said switching mechanisms arranged adjacent to said color printing units to switch the state of at least one color printing unit having an unused condition, corresponding to an unused color, to said evacuation state wherein said control unit determines an unused color in response to an unused color designating unit which designates an unused color in response to an operator selection of at least one color of said plural colors.

10. A color printer comprising:

plural color printing units each for printing a print image in a color on a print sheet to perform a color printing by overlaying plural colors, each of said plural color printing units including a developing unit, a photosensitive body, an optical system, and a transfer roller;

switching mechanisms each for switching the state of each of said color printing units to either a return state in which each of said color printing units performs a printing operation on said print sheet or an evacuation state in which each of said color printing units is not directly in contact with the printing sheet, said switching mechanisms being respectively arranged adjacent to said color printing units; and a control unit for controlling the switching operation of each of said switching mechanisms;

said control unit controlling the switching operation of at least one of said switching mechanisms arranged adjacent to said color printing units to switch the, state of at least one color printing unit having an unused condition, corresponding to an unused color, to said evacuation state wherein said control unit determines as an unused color a color which is judged as one which is never used during said overlay printing operation according to overlay color information received prior to an overlay print request from an upper unit.

11. A color printer comprising:

plural color painting units each for printing a print image in a color on a print sheet to perform a color printing by overlaying plural colors, each of said plural color printing units including a developing unit, a photosensitive body, an optical system, and a transfer roller;

switching mechanisms each for switching the state of each of said color printing units to either a return state in which each of said color printing units performs a printing operation on said print sheet or an evacuation state in which each of said color printing units is not directly in contact with the printing sheet, said switching mechanisms being respectively arranged adjacent to said color printing units; and a control unit for controlling the switching operation of each of said switching mechanisms;

said control unit controlling the switching operation of at least one of said switching mechanisms arranged adjacent to said color printing units to switch the state of at least one color printing unit having an unused condition, corresponding to an unused color, to said evacuation state, wherein said control unit can execute at least two modes among four modes, said four modes including a first mode in which said unused color is determined as a color which is never used during a specified number of consecutively printed print sheets, a second mode in which said unused color which is judged as a color never to be used during printing data according to color information received prior to print job data or print file data from an upper unit, a third mode in which said unused color is designated by means of an unused color designating unit which externally designates an unused color in response to a selection of at least one color of said plural colors by an operator, and a fourth mode in which said unused color which is judged as a color never to be used during an overlay printing operation according to overlay color information received prior to overlay print request from an upper unit; and further comprising a mode designating unit which externally designates one mode among said at least two modes.

* * * * *